US008539057B2

(12) United States Patent
Chang et al.

(10) Patent No.: US 8,539,057 B2
(45) Date of Patent: Sep. 17, 2013

(54) WEBSITE PRESENCE

(75) Inventors: Jack H. Chang, Saratoga, CA (US);
Sherman Tuan, Cupertino, CA (US);
William H. Sheu, Fremont, CA (US)

(73) Assignee: Purplecomm, Inc., Santa Clara, CA (US)

( * ) Notice: Subject to any disclaimer, the term of this patent is extended or adjusted under 35 U.S.C. 154(b) by 459 days.

(21) Appl. No.: 12/070,771

(22) Filed: Feb. 20, 2008

(65) Prior Publication Data
US 2009/0210503 A1 Aug. 20, 2009

(51) Int. Cl.
*G06F 15/173* (2006.01)

(52) U.S. Cl.
USPC ............ 709/223; 709/203; 709/217; 709/224

(58) Field of Classification Search
USPC .......................... 709/223, 224, 203, 217, 219
See application file for complete search history.

(56) References Cited

U.S. PATENT DOCUMENTS

| | | | |
|---|---|---|---|
| 5,995,943 A | 11/1999 | Bull et al. | |
| 6,278,966 B1 * | 8/2001 | Howard et al. | 703/23 |
| 6,661,431 B1 * | 12/2003 | Stuart et al. | 715/733 |
| 6,976,056 B1 * | 12/2005 | Kumar | 709/206 |
| 7,349,827 B1 * | 3/2008 | Heller et al. | 702/186 |
| 7,424,476 B2 | 9/2008 | Apparao et al. | |
| 7,647,323 B2 * | 1/2010 | Kasriel et al. | 709/224 |
| 7,822,821 B2 * | 10/2010 | Foote | 709/206 |
| 7,877,332 B2 * | 1/2011 | Bantz et al. | 705/346 |
| 7,945,612 B2 * | 5/2011 | Raghav et al. | 709/201 |
| 7,945,619 B1 * | 5/2011 | Chawla et al. | 709/204 |
| 7,958,212 B1 * | 6/2011 | Wong et al. | 709/223 |
| 8,046,272 B1 * | 10/2011 | Nguyen | 705/26.7 |
| 2001/0035443 A1 * | 11/2001 | Jones et al. | 224/222 |
| 2002/0040394 A1 * | 4/2002 | Shapira | 709/224 |
| 2002/0178072 A1 | 11/2002 | Gusler et al. | |
| 2002/0184089 A1 | 12/2002 | Tsou et al. | |
| 2003/0167195 A1 * | 9/2003 | Fernandes et al. | 705/8 |
| 2004/0225687 A1 * | 11/2004 | Larsson et al. | 707/104.1 |
| 2005/0102358 A1 | 5/2005 | Gold et al. | |
| 2005/0165889 A1 * | 7/2005 | Muret et al. | 709/203 |
| 2006/0119882 A1 * | 6/2006 | Harris et al. | 358/1.15 |
| 2006/0168001 A1 * | 7/2006 | Lasater et al. | 709/205 |
| 2006/0265495 A1 * | 11/2006 | Butler et al. | 709/224 |
| 2007/0005725 A1 * | 1/2007 | Morris | 709/218 |
| 2007/0130258 A1 * | 6/2007 | Almberg | 709/204 |
| 2007/0150370 A1 * | 6/2007 | Staib et al. | 705/26 |
| 2007/0150825 A1 * | 6/2007 | Jachner | 715/765 |

(Continued)

OTHER PUBLICATIONS

"Instant Messaging," downloaded from Wikipedia, http://en.wikipedia.org/wiki/Instant_messenger, Feb. 19, 2008, 9 pages.

(Continued)

*Primary Examiner* — Lashonda Jacobs
(74) *Attorney, Agent, or Firm* — Nixon Peabody LLP

(57) ABSTRACT

Website presence includes receiving aggregated website presence information describing website presence information for one or more objects of a website, and displaying the aggregated website presence information based at least in part on a website object profile for an object of the website. The website presence information describes one or more of the state of a website object regarding its participation in a communication session, the ability of the website object to participate in a communication session, and the willingness of the website object to participate in a communication session. Each of the one or more objects represents an entity associated with the website.

52 Claims, 25 Drawing Sheets

(56) References Cited

U.S. PATENT DOCUMENTS

| | | | |
|---|---|---|---|
| 2007/0150941 A1* | 6/2007 | Jachner | 726/5 |
| 2007/0265859 A1* | 11/2007 | Jachner | 705/1 |
| 2008/0010344 A1 | 1/2008 | Wherry et al. | |
| 2008/0034040 A1 | 2/2008 | Wherry et al. | |
| 2008/0052377 A1* | 2/2008 | Light | 709/218 |
| 2008/0126484 A1* | 5/2008 | Wherry et al. | 709/204 |
| 2008/0189408 A1* | 8/2008 | Cancel et al. | 709/224 |
| 2008/0306830 A1* | 12/2008 | Lasa et al. | 705/26 |
| 2009/0006119 A1* | 1/2009 | Langshur et al. | 705/1 |
| 2009/0006566 A1 | 1/2009 | Veeramachaneni et al. | |
| 2009/0055369 A1 | 2/2009 | Phillips et al. | |
| 2009/0083383 A1 | 3/2009 | Piper et al. | |
| 2009/0083421 A1* | 3/2009 | Glommen et al. | 709/224 |
| 2009/0187455 A1* | 7/2009 | Fernandes et al. | 705/9 |
| 2009/0210352 A1 | 8/2009 | Chang et al. | |
| 2009/0210358 A1 | 8/2009 | Chang et al. | |
| 2009/0248494 A1* | 10/2009 | Hueter et al. | 705/10 |
| 2009/0248599 A1* | 10/2009 | Hueter et al. | 706/20 |
| 2009/0249244 A1* | 10/2009 | Robinson et al. | 715/781 |
| 2009/0265256 A1* | 10/2009 | Reed | 705/27 |
| 2010/0075673 A1* | 3/2010 | Colbert et al. | 455/435.1 |
| 2010/0198742 A1 | 8/2010 | Chang et al. | |
| 2012/0124206 A1* | 5/2012 | Butler et al. | 709/224 |
| 2012/0276927 A1* | 11/2012 | Pitt | 455/456.2 |

OTHER PUBLICATIONS

Rosenberg, J. et al., "SIP: Session Initiation Protocol," Network Working Group, downloaded from http://www.ietforg/rfc/rfc3261.txt, Feb. 19, 2008, 252 pages.

Office Action in U.S. Appl. No. 12/070,872, mailed Jun. 7, 2010.

Office Action in U.S. Appl. No. 12/070,872, mailed Sep. 23, 2009.

Office Action in U.S. Appl. No. 12/365,050, mailed Sep. 22, 2010.

O'Hear, S., "Clurtr: Share Your Web Suiting in Real Time," Web log post. ZDNet, Web, Sep. 14, 2010, <http://www.zdnet.com/blog/social/cluztr-share-your-web-surfing-in-real-time/137>.

Cluztr—"What Are Your Friends Clicking?" APML, Archived webpages or postings published on or before Jul. 9, 2007, retrieved from www.archive.org, Web, Sep. 14, 2010, <http://www.cluztr.com/>.

Office Action in U.S. Appl. No. 12/365,050, mailed May 16, 2011.

Office Action in U.S. Appl. No. 12/070,770, mailed Jan. 25, 2012.

Office Action in U.S. Appl. No. 12/070,770, mailed Oct. 24, 2012.

Office Action in U.S. Appl. No. 12/070,872, mailed Mar. 28, 2013.

* cited by examiner

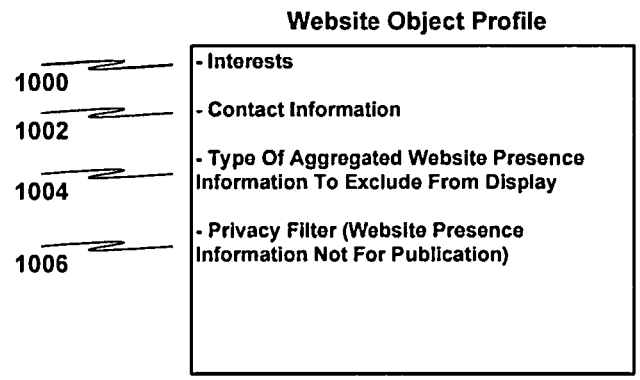
FIG 10A
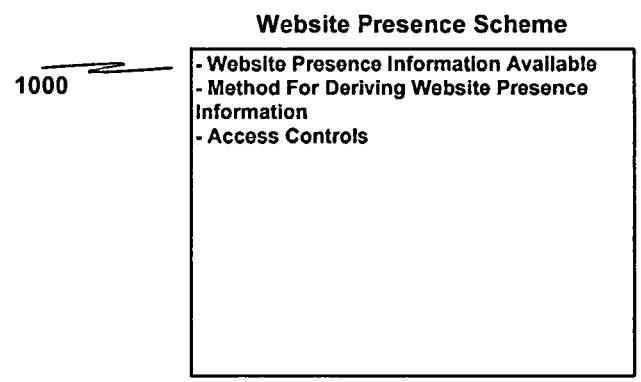
FIG 10B
FIG. 10

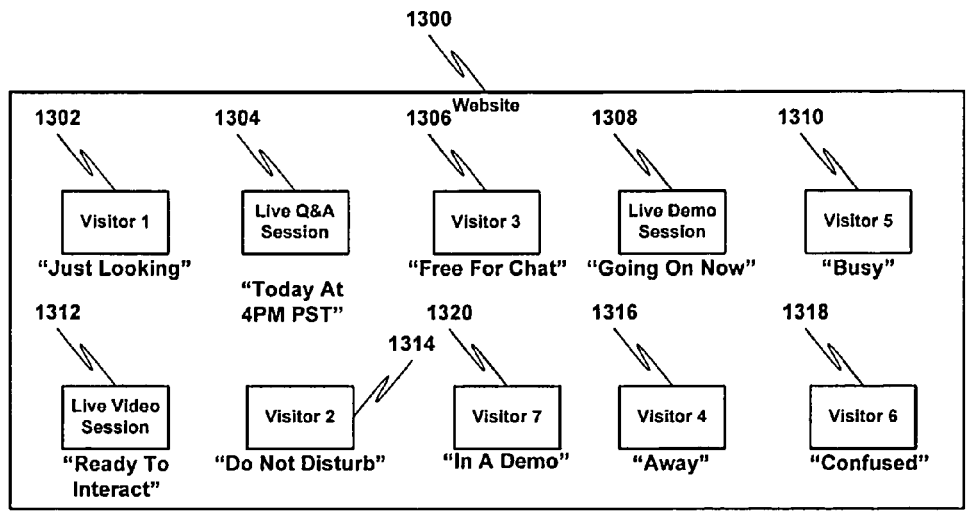
FIG 13A
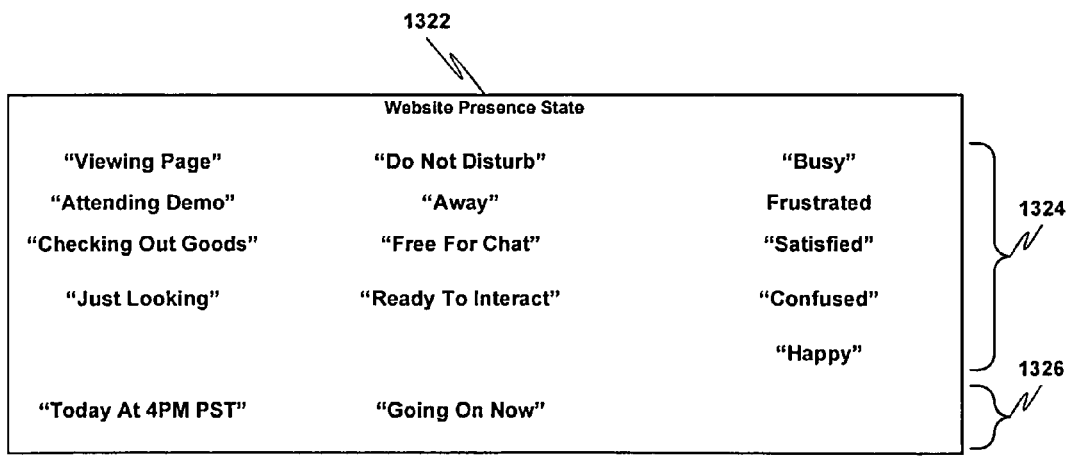
FIG 13B
FIG. 13

WEBSITE PRESENCE

RELATED APPLICATIONS

This application may be related to one or more of the following commonly assigned U.S. patent applications filed on even date herewith:

Ser. No. 12/070,872, entitled "Collaborative Website Presence"; and

Ser. No. 12/070,770, entitled "Website Presence Marketplace".

The related applications are hereby incorporated herein by reference as if set forth fully herein.

FIELD OF THE INVENTION

The present invention relates to the field of computer science. More particularly, the present invention relates to website presence.

BACKGROUND OF THE INVENTION

Presence information for typical instant messenger services is based on an invitation from one user to another user. Each user must register with the instant messenger service and setup an account to become a member in order to share the presence information with others on the user's "buddy list." Users on each other's buddy list can engage in instant messaging (usually in the form of real-time text-based message exchange) or voice chat based on the presence state of each user. The presence state of each user is typically set manually by the user to values such as "busy," "do-not-disturb," "out to lunch," "available," and "appear offline." This basic level of presence information is often a rough approximation of the user's actual status and reveals very little about the status of a user who is browsing a particular website. Accordingly, a need exists for an improved solution for facilitating communication between website visitors.

SUMMARY OF THE INVENTION

Website presence includes receiving aggregated website presence information describing website presence information for one or more objects of a website, and displaying the aggregated website presence information based at least in part on a website object profile for an object. The website presence information describes one or more of the state of a website object regarding its participation in a communication session, the ability of the website object to participate in a communication session, and the willingness of the website object to participate in a communication session. Each of the one or more objects represents an entity associated with the website.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 10A is a block diagram that illustrates a website object profile in accordance with one embodiment of the present invention.

FIG. 10B is a block diagram that illustrates a website presence scheme in accordance with one embodiment of the present invention.

FIG. 13A is a block diagram that illustrates multiple website objects and associated website presence information in accordance with one embodiment of the present invention.

FIG. 13B is a block diagram that illustrates multiple kinds of website presence information in accordance with one embodiment of the present invention.

DETAILED DESCRIPTION

Figure 1:
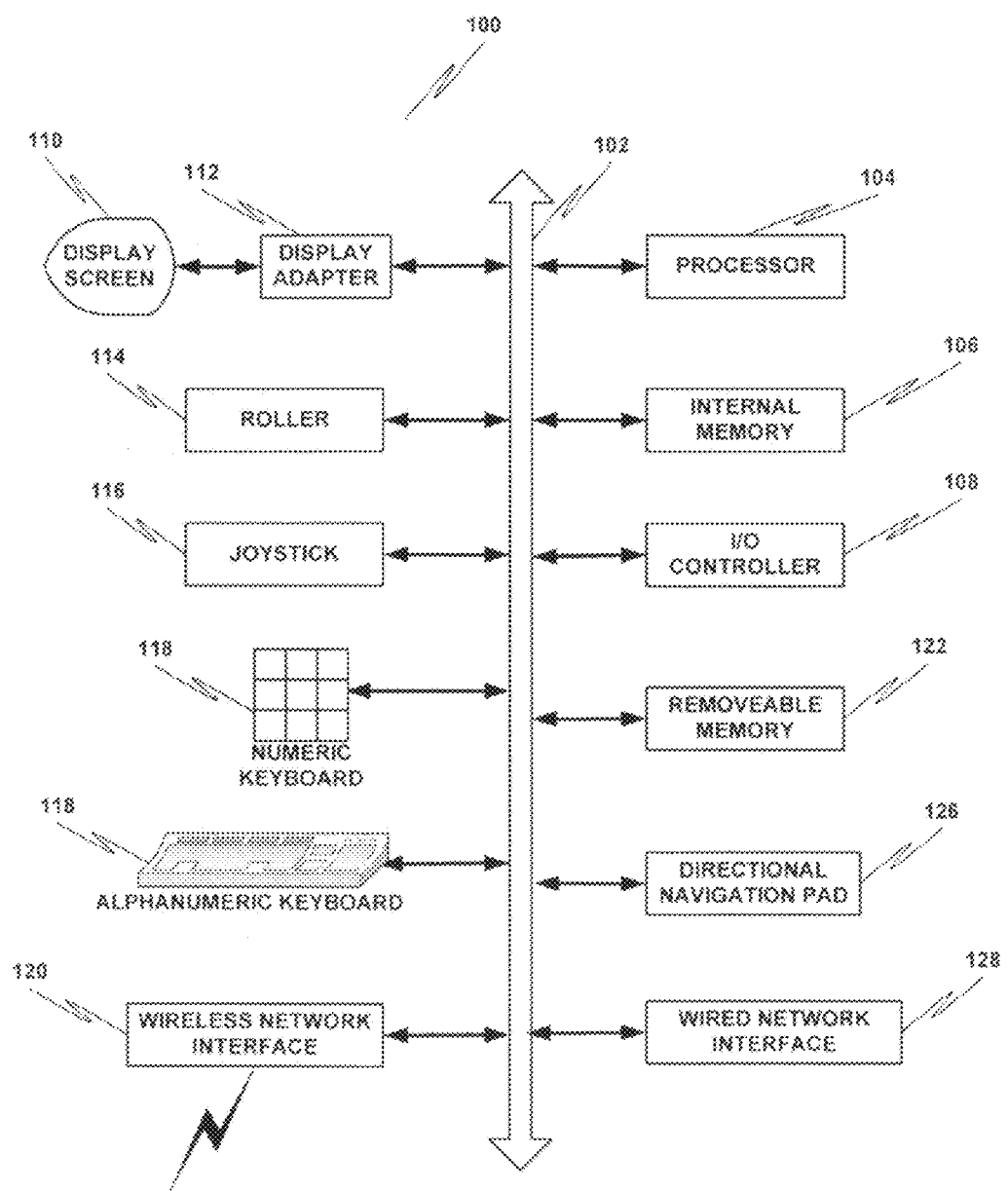
FIG. 1 is a block diagram of a computer system suitable for implementing aspects of the present invention.

Embodiments of the present invention are described herein in the context of website presence. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data stores" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, repositories, file systems, record systems, object oriented databases, relational databases, SQL databases, audit trails and logs, program memory, cache and buffers, and the like.

In the context of the present invention, the term "network interface" describes the means by which users including website visitors access a network for the purposes of communicating across it or retrieving information from it.

In the context of the present invention, the term "user interface" describes any device or group of devices for presenting and/or receiving information and/or directions to and/or from persons. A user interface may comprise a means to present information to persons, such as a visual display projector or screen, a loudspeaker, a light or system of lights, a printer, a Braille device, a vibrating device, or the like. A user interface may also include a means to receive information or directions from persons, such as one or more or combinations of buttons, keys, levers, switches, knobs, touch pads, touch screens, microphones, speech detectors, motion detectors, cameras, and light detectors. Exemplary user interfaces comprise pagers, mobile phones, desktop computers, laptop computers, handheld and palm computers, personal digital assistants (PDAs), cathode-ray tubes (CRTs), keyboards, keypads, liquid crystal displays (LCDs), control panels, horns, sirens, alarms, printers, speakers, mouse devices, consoles, and speech recognition devices.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

In the context of the present invention, the term "website presence" describes one or more of the state of a website object regarding its participation in a communication session, the ability of the website object to participate in a communication session, and the willingness of the website object to participate in a communication session.

In the context of the present invention, the term "website object" describes a representation of an entity associated with a website. A website object may represent a visitor to the website. A website object may also represent an event associated with the website, such as a live demonstration session and a live question-and-answer session. By way of example, a vendor's website may feature a live question and answer session to answer questions about the vendor's products. An object may also comprise an interactive video session. By way of example, a vendor's website may feature a live demonstration session to demonstrate the operation of one or more of the vendor's products. The particular presence information of a website object that is tracked and published is configurable by the website object.

In the context of the present invention, the term "aggregated website presence" describes a collection of website presence information regarding multiple objects associated with the same website. The aggregated website presence information includes presence information of each website object, and website presence information that describes the collection of website objects as a whole. By way of example, the aggregated website presence information may include the website page viewing activity presence, discussion/forum/event presence, and sales activity presence.

In the context of the present invention, the term "subscriber" refers to an entity that requests access to particular website presence information. A subscriber may pay a fee in return for receiving all or part of the requested website presence information.

FIG. 1 depicts a block diagram of a computer system 100 suitable for implementing aspects of the present invention. As shown in FIG. 1, system 100 includes a bus 102 which interconnects major subsystems such as a processor 104, an internal memory 106 (such as a RAM), an input/output (I/O) controller 108, a removable memory (such as a memory card) 122, an external device such as a display screen 110 via display adapter 112, a roller-type input device 114, a joystick 116, a numeric keyboard 118, an alphanumeric keyboard 118, directional navigation pad 126 and a wireless interface 120. Many other devices can be connected. Wireless network interface 120, wired network interface 128, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 1 to be present to practice the present invention. Furthermore, the devices and subsystems may be interconnected in different ways from that shown in FIG. 1. Code to implement the present invention may be operably disposed in internal memory 106 or stored on storage media such as removable memory 122, a floppy disk, a thumb drive, a CompactFlash® storage device, a DVD-R ("Digital Versatile Disc" or "Digital Video Disc"-Recordable), a DVD-ROM ("Digital Versatile Disc" or "Digital Video Disc" read-only memory), a CD-R (Compact Disc-Recordable), or a CD-ROM (Compact Disc read-only memory).

Figure 2:
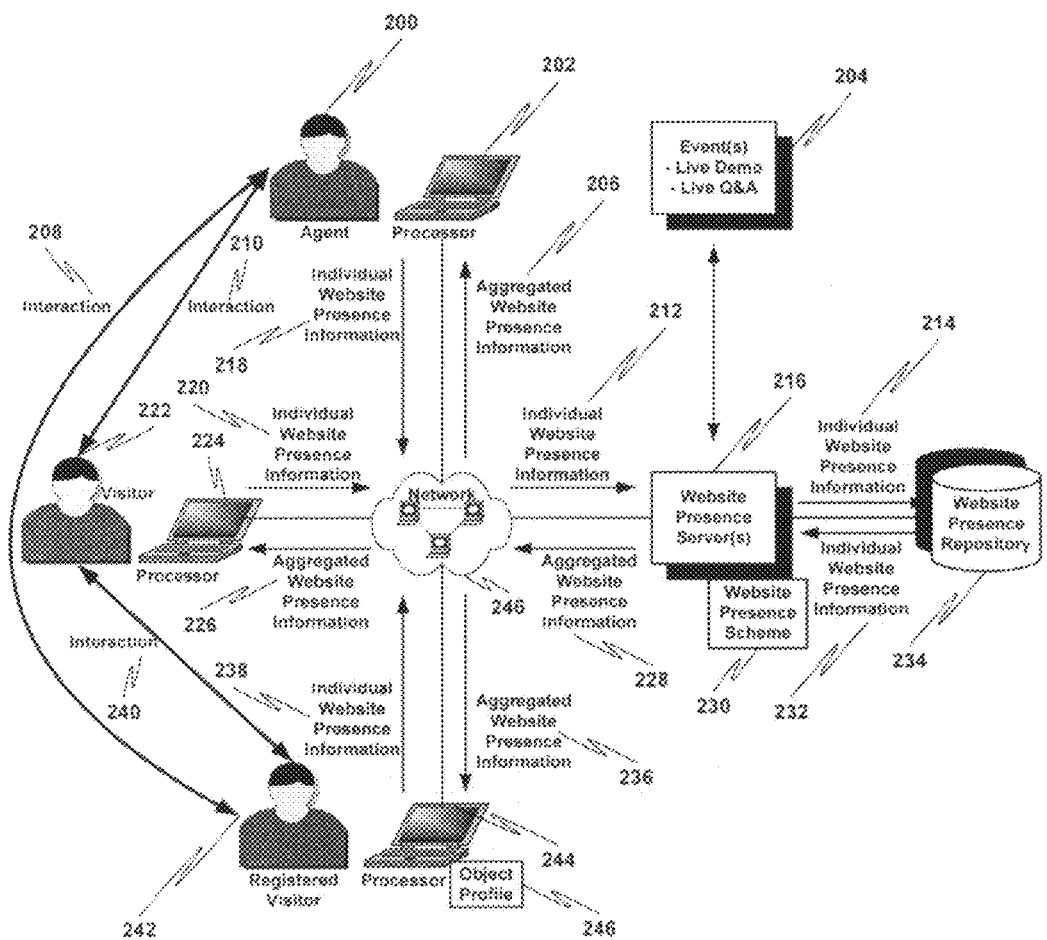
FIG. 2 is a block diagram that illustrates a system for website presence in accordance with one embodiment of the present invention.

FIG. 2 is a block diagram that illustrates a system for website presence in accordance with one embodiment of the present invention. As shown in FIG. 2, a system for website presence comprises one or more website presence servers 216 communicatively coupled to a website presence repository 234 and to one or more processors (244, 224, 202). Embodiments of the present invention that have multiple website presence servers 216 may implement redundancy and HA (High Availability) so in the event one of the website presence servers fails or otherwise must be taken offline, a website presence capability can still be supported by the remaining website presence servers. One or more website presence servers can be specified by host names through a DNS service. Each of processors (244, 224, 202) is associated with a respective user (242, 222, 200) who may want to access each others' website presence information. According to one embodiment of the present invention, processors (244, 224, 202) are configured to receive aggregated website presence information describing website presence information for one or more objects of a website, and display the aggregated website presence information based at least in part on an object profile for a website object. A website object profile comprises information related to a website object. Website object profiles are discussed below in more detail with reference to FIG. 10A. Processors (244, 224, 202) may also include a website presence plug-in providing added functionality to website visitors. By way of example, the processor associated with a website visitor desiring a voice chat capability can be configured with a website presence functionality such as a plug-in providing a voice chat capability.

The one or more website presence servers 216 are configured to receive website presence information from one or more objects of a website, aggregate the received website presence information based at least in part on a website presence scheme for the website to create aggregated website presence information, and send the aggregated website presence information to one or more subscribers. A website presence scheme identifies the aggregated website presence information that is available from a particular website, how the aggregated website presence information is determined, and how the aggregated website presence information is to be distributed. A website presence scheme is described in more detail below with reference to FIG. 10B. The aggregated website presence information may be stored in website presence repository 234. Alternatively, the aggregated website presence information may be kept in a cache associated with the one or more website presence servers 216.

According to another embodiment of the present invention, processors (244, 224, 202) are configured to determine whether this is the first time that a website visitor has visited a particular website, and if it is the first time, receive functionality such as a website presence plug-in, receive a cookie identifying the website visitor for subsequent website presence activities, and create a website object profile. The one or more website presence servers 216 are configured to determine whether this is the first time that the website visitor has visited a particular website, and if it is the first time that the website visitor has visited the website, send functionality such as a website presence plug-in to the website visitor's processor to provide communication functionality not already present on the website visitor's processor, send a cookie identifying the website visitor for subsequent website presence activities, and create a website object profile for the website visitor. Changes made to a website object profile on a visitor's processor and changes made to a corresponding website object profile on one or more website presence servers 216 are synchronized, such as when the registered website visitor makes a change to the website object profile, or when the registered website visitor logs into the website using a different processor.

According to another embodiment of the present invention, processors (244, 224, 202) are configured to collect visitor website presence information, apply a privacy filter to the visitor website presence information to create filtered visitor website presence information, send the filtered visitor website presence information to one or more website presence servers, receive aggregated website presence information from the one or more website presence servers, and present the aggregated website presence information based at least in part on a website object profile for the visitor. Processors (244, 224, 202) are further configured to repeat the collecting, applying, sending, receiving, and presenting until the website visitor leaves the website. The one or more website presence servers 216 are configured to receive filtered visitor website presence information from one or more objects of a website, aggregate the visitor website presence information based at least in part on a website presence scheme for the website, optionally apply one or more access controls to the aggregated website presence information to potentially limit access to all or part of the aggregated website presence information, and send the aggregated website presence information that was not excluded by application of the one or more access controls to one or more subscribers.

According to one embodiment of the present invention, a website visitor has at least one of three roles: anonymous visitor 222, registered visitor 242, and website agent 200. An anonymous visitor 222 surfs the website without previously registering with the website. According to one embodiment of the present invention, an anonymous visitor 222 is identified based at least in part on information about the anonymous visitor's processor, such as an identifier for the primary hard drive of the processor or the serial number of the processor's CPU. According to one embodiment of the present invention, an anonymous visitor 222 is uniquely identified based at least in part on information extracted from a network connection associated with the anonymous visitor.

A registered visitor 242 surfs the website after registering with the website. The website knows the identity of a registered visitor 242. The registered visitor 242 is identified by the registered visitor's login ID after registration.

A website agent 200 provides one or more services or offers one or more products or services for sale at the website. A website agent 200 must first register with the website. An agent 200 may stay online and make its presence known to all visitors.

The presence information may be used to facilitate interaction between one or more of event object 204, registered visitor 242, anonymous visitor 222, and agent 200. An interaction between agent 200 via processor 202 and registered visitor 242 via processor 244 is shown at reference numeral 208. An interaction between agent 200 via processor 202 and anonymous visitor 222 via processor 224 is shown at reference numeral 210. An interaction between anonymous visitor 222 via processor 224 and registered visitor 242 via processor 244 is shown at reference numeral 242.

According to example embodiments of the present invention, two or more anonymous visitors may interact. By way of example, a first anonymous visitor visiting a vendor's website may view the items in a second anonymous visitor's shopping cart (a type of website presence information) and find that the second anonymous visitor's shopping cart includes an item that the first anonymous visitor is considering for purchase. The first anonymous visitor might then invite the second anonymous visitor to a chat session to discuss the item.

According to example embodiments of the present invention, two or more registered visitors may interact. By way of example, a first registered visitor visiting a vendor's website may view the interests (a type of website presence information for registered visitors) of a second registered visitor currently visiting the same website. The first registered visitor may notice that the second registered visitor has similar interests and then invite the second registered visitor to a chat session to discuss their common interests.

According to example embodiments of the present invention, a registered visitor may interact with an event object. By way of example, a registered visitor may attend a live product demonstration (a type of event object) at the website.

According to example embodiments of the present invention, an anonymous visitor may interact with an event object. By way of example, a registered visitor may attend a live question-and-answer session (a type of event object) at the website.

While FIG. 2 illustrates one registered visitor, 242, one anonymous visitor 222, and one agent 200, embodiments of the present invention may be applied to a system having any number of registered visitors, anonymous visitors, and agents.

Figure 3:
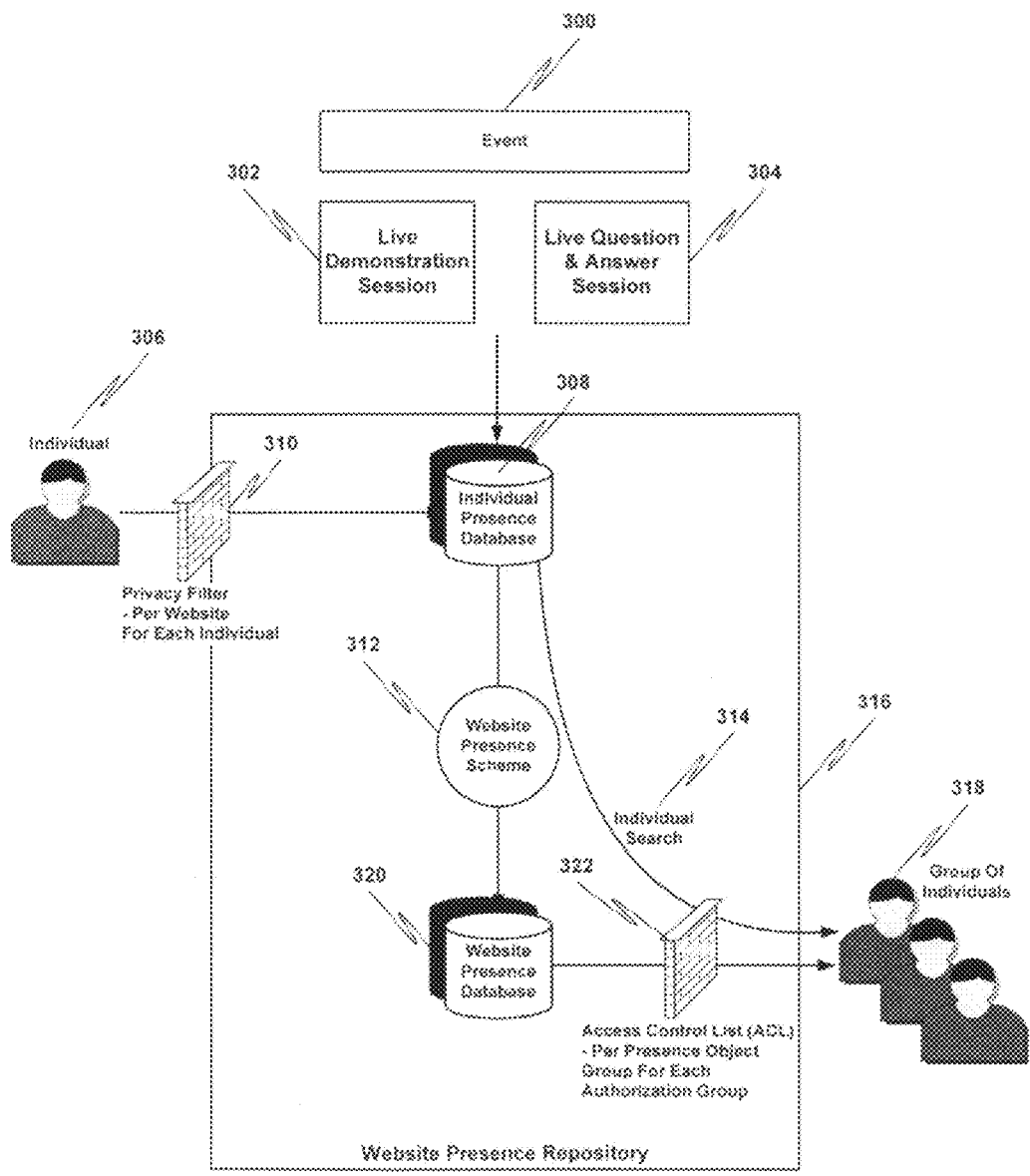
FIG. 3 is a block diagram that illustrates privacy control and access control in a system for website presence in accordance with one embodiment of the present invention.

FIG. 3 is a block diagram that illustrates privacy control and access control in a system for website presence in accordance with one embodiment of the present invention. Website presence repository 316 of FIG. 3 provides more detail for reference numeral 234 of FIG. 2. Website repository 316 comprises an individual presence database 308 for storing website presence information for individuals such as individual 306, and for events 300, such as live demonstration event 302 and live question & answer session event 304. Website presence repository 316 also comprises a website presence database for storing website presence information from individual presence database 308 as specified by the website's site presence scheme 312.

Still referring to FIG. 3, privacy filter 310 enables each individual 306 visiting the website to specify how the individual's 306 website presence information is collected, and which of the individual's 306 website presence information is made available for viewing by other individuals visiting the same website 318, including an agent. An individual's 306 website presence information is filtered according to the privacy filter 310 before being sent to a website presence server.

According to one embodiment, a separate privacy filter 310 for an anonymous website visitor is stored on the anonymous website visitor's processor. According to another embodiment of the present invention, a registered website visitor's privacy filter 310 is stored both on the registered website visitor's processor, and on the website's website presence repository. Changes made to both copies of a registered website visitor's privacy filter are synchronized, such as when the registered website visitor makes a change to the filter, or when the registered website visitor logs into the website using a different processor.

Referring again to FIG. 3, website presence scheme 312 comprises a definition of how website presence information is calculated and aggregated from the individual website presence information collected. According to one embodiment of the present invention, the website presence scheme 312 comprises a set of queries for implementing in programming code in a website presence server, or as a database stored procedure. Individual presence information from individual presence database 308 is processed according to the website presence scheme 312, and the results of the processing are stored in website presence database 320. Both individual presence database 308 and website presence database 320 are updated to reflect the current website presence state of website visitors and website events.

Still referring to FIG. 3, an access control list (ACL) specifies the access rights one or more individuals or group of individuals have to particular website presence information. The access rights include whether the one or more individuals or group of individuals (authorization group) is allowed to view the particular website presence information (presence object group). The access rights may also include whether the one or more individuals or group of individuals is prohibited from viewing the particular website presence information. According to one embodiment of the present invention, the authorization group is based at least in part on the website visitor's characteristics or attributes, such as the website visitors' geographical region (possibly derived from an IP address), a website visitor's subscription level as indicated during account sign-up. According to one embodiment of the present invention, a presence object group is categorized based at least in part on the website presence scheme, e.g. all live demonstration sessions, all registered visitors, etc. As shown in FIG. 3, access control list 322 is stored in website presence repository 316.

According to one embodiment of the present invention, a search interface (314) is configured to enable a website visitor to search individual presence data under the access control mechanism discussed above. If the website visitor in an authorization group has access to a presence object group, the website visitor is allowed to perform a search for individual website presence information within the presence object group.

According to one embodiment of the present invention, the search interface allows a website visitor to search for website visitors, activities, and events having a particular status. By way of example, a website visitor may search for a website visitor whose presence information includes "checking out products," so that the two website visitors might talk about shopping experiences at the website. As a further example, an agent may search for a website visitor whose presence status is "need help" or confused," so that the agent may initiate a conversation with the website visitor. As a further example, a website visitor may search for a live demonstration event whose event presence information is "Hot Event," so that the website visitor may participate in the event.

Figure 4:
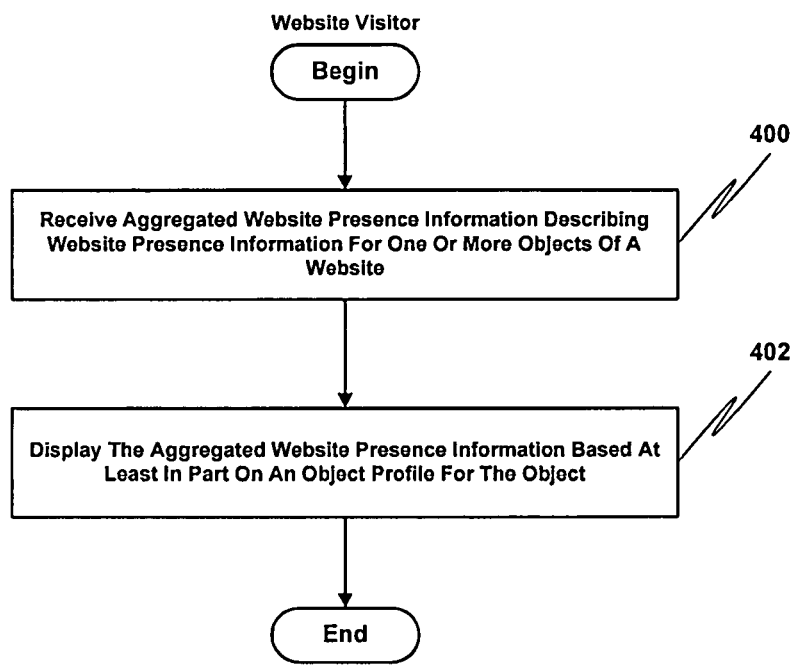
FIG. 4 is a high-level flow diagram that illustrates a method for website presence from the perspective of a website visitor in accordance with one embodiment of the present invention.

FIG. 4 is a high-level flow diagram that illustrates a method for website presence from the perspective of a website visitor in accordance with one embodiment of the present invention. The processes illustrated in FIG. 4 may be implemented in hardware, software, firmware, or a combination thereof. At 400, aggregated website presence information describing website presence information for one or more objects of a website is received. Each of the one or more objects represents a website visitor. At 402, the aggregated website presence information is displayed based at least in part on an object profile for a visitor to the website.

Figure 5:
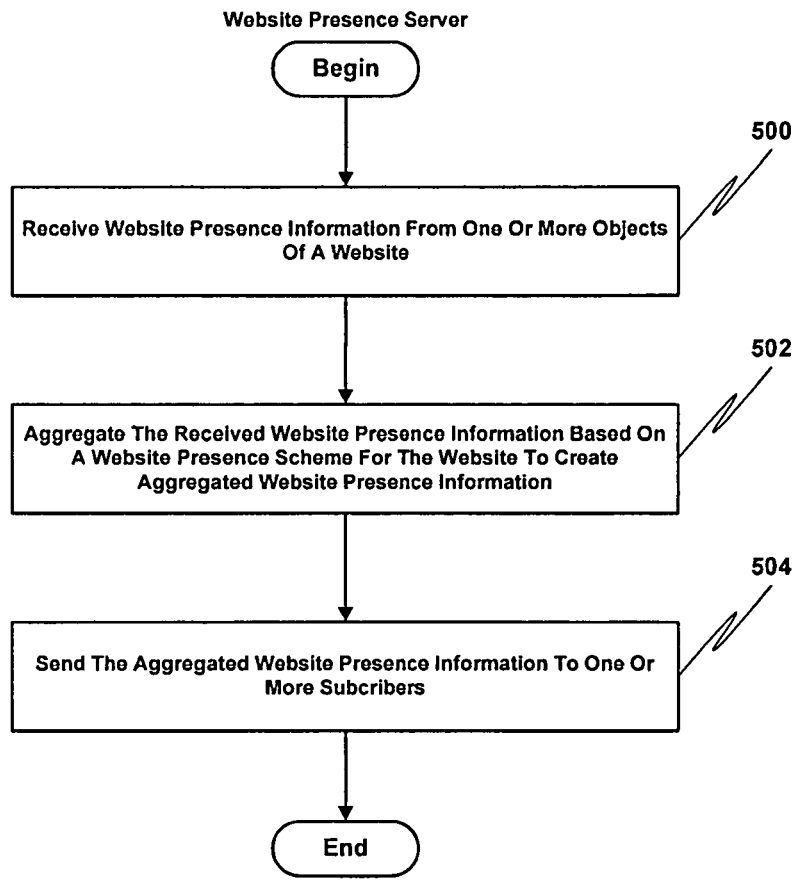
FIG. 5 is a high-level flow diagram that illustrates a method for website presence from the perspective of a website presence server in accordance with one embodiment of the present invention.

FIG. 5 is a high-level flow diagram that illustrates a method for website presence from the perspective of a website presence server in accordance with one embodiment of the present invention. The processes illustrated in FIG. 5 may be implemented in hardware, software, firmware, or a combination thereof. At 500, website presence information from one or more objects of a website is received. At 502, the received website presence information is aggregated based on a website presence scheme for the website, to create aggregated website presence information. At 504, the aggregated website presence information is sent to one or more subscribers.

Figure 6:
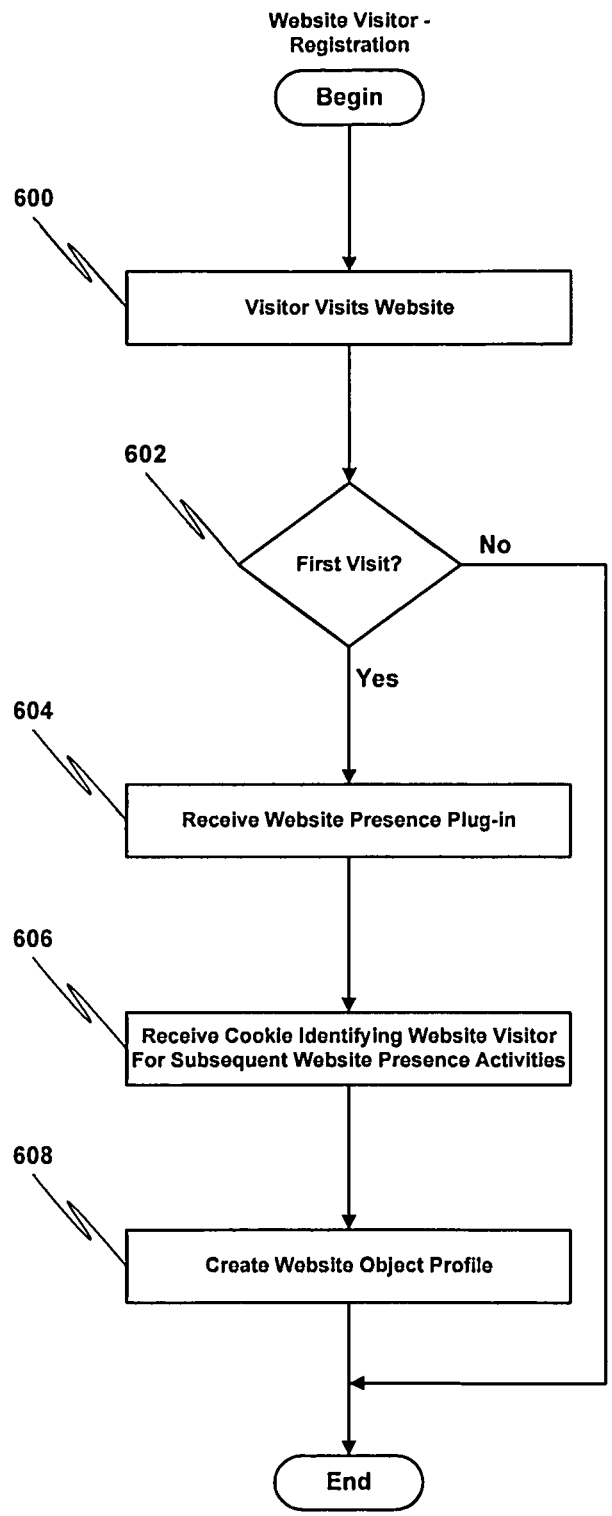
FIG. 6 is a flow diagram that illustrates a method for website visitor registration from the perspective of a website visitor in accordance with one embodiment of the present invention.

FIG. 6 is a flow diagram that illustrates a method for website registration from the perspective of a website visitor in accordance with one embodiment of the present invention. The processes illustrated in FIG. 6 may be implemented in hardware, software, firmware, or a combination thereof. At 600, a website visitor visits a website. According to one embodiment of the present invention, a website which deploys a website presence facility embeds appropriate code into its Web pages, such as the following Javascript excerpt:

```
<script type="text/javascript"
src="http://www.purplegoods.com/seed/sitepresence.php?
department=1&what=hidden&pingtimes=15">
</script>
```

The code shown above invokes an ActiveX plug-in program which implements a communication protocol such as SIP SIMPLE to communicate presence information between peers. Those of ordinary skill in the art will recognize that other programming languages and communication protocols may be used.

Still referring to FIG. 6, at 602, a determination is made regarding whether this is the first time that the visitor has visited the website. If this is the first time the visitor has visited the website and if the visitor desires communication functionality not already present on the visitor's processor, at 604 functionality such as a website presence plug-in is received. At 606, a cookie identifying the website visitor for subsequent website presence activities is received. At 608, a website object profile is created. Website object profiles are discussed below in more detail with reference to FIG. 10A.

Figure 7:
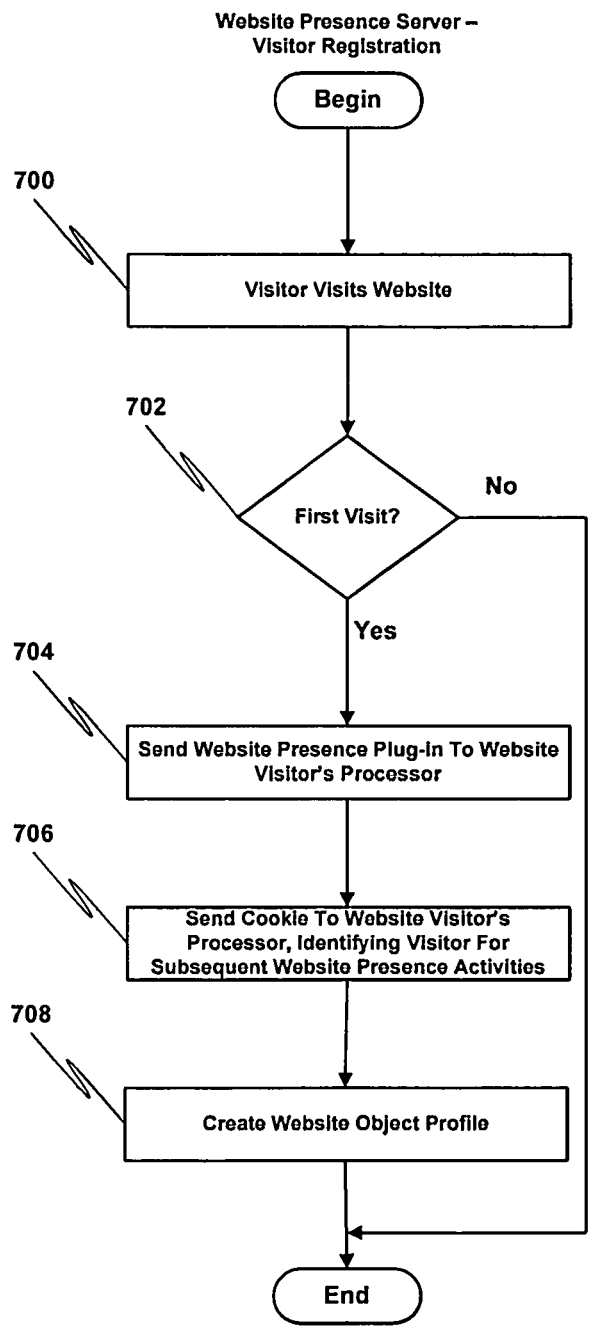
FIG. 7 is a flow diagram that illustrates a method for website visitor registration from the perspective of a website presence server in accordance with one embodiment of the present invention.

FIG. 7 is a flow diagram that illustrates a method for website visitor registration from the perspective of a website presence server in accordance with one embodiment of the present invention. The processes illustrated in FIG. 7 may be implemented in hardware, software, firmware, or a combination thereof. At 700, a website visitor visits a website. At 702, a determination is made at a website visitor's processor regarding whether this is the first time that the visitor has visited the website. If this is the first time the website visitor has visited the website and if the website visitor desires communication functionality not already present on the visitor's processor, at 704, functionality such as a website presence plug-in is sent from the website presence server to the website visitor's processor. At 706, a cookie generated by the website and identifying the website visitor for subsequent website presence activities is sent to the website visitor's processor. The website visitor's browser stores the cookie on the website visitor's browser. At 708, a website object profile is created by the website visitor's processor.

Figure 8:
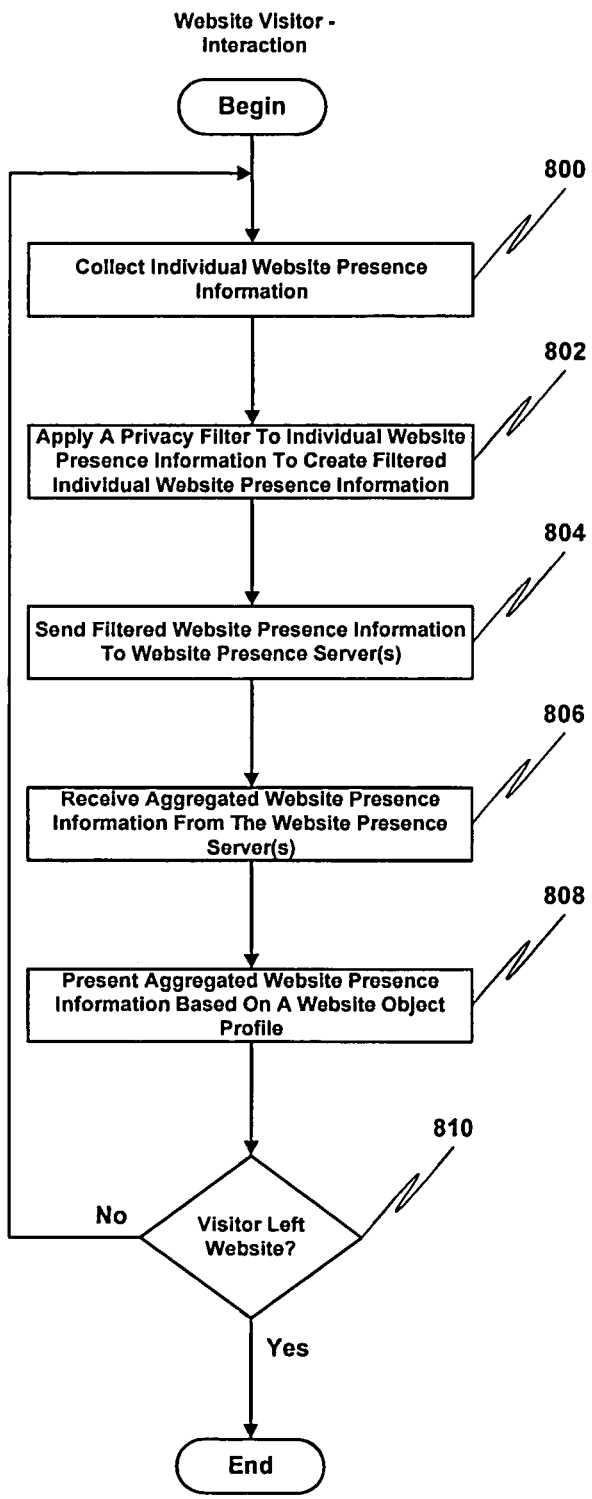
FIG. 8 is a flow diagram that illustrates a method for website presence from the perspective of a website visitor in accordance with one embodiment of the present invention.

FIG. 8 is a flow diagram that illustrates a method for website presence from the perspective of a website visitor in accordance with one embodiment of the present invention. The processes illustrated in FIG. 8 may be implemented in hardware, software, firmware, or a combination thereof. At 800, visitor website presence information is collected. At 802, a privacy filter is applied to the visitor website presence information to create filtered visitor website presence information. Privacy filters are described in more detail below with reference to FIG. 10A. At 804, the filtered visitor website presence information is sent to one or more website presence servers. At 806, aggregated website presence information is received from the one or more website presence servers. At 808, the aggregated website presence information is presented based at least in part on a website object profile for the visitor. At 810, a determination is made regarding whether the website visitor has left the website. If the website visitor has not left the website, processing continues at 800.

Figure 9:
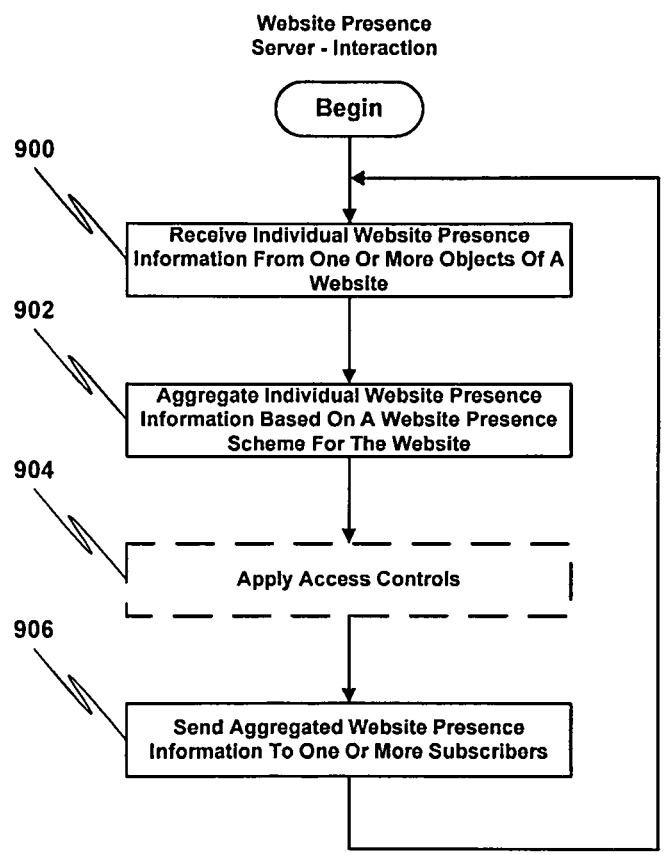
FIG. 9 is a flow diagram that illustrates a method for website presence from the perspective of a website presence server in accordance with one embodiment of the present invention.

FIG. 9 is a flow diagram that illustrates a method for website presence from the perspective of a website presence server in accordance with one embodiment of the present invention. The processes illustrated in FIG. 9 may be implemented in hardware, software, firmware, or a combination thereof. At 900, visitor website presence information is received from one or more objects of a website. At 902, the visitor website presence information is aggregated based at least in part on a website presence scheme for the website. At 904, one or more access controls are optionally applied to the aggregated website presence information, potentially limiting access to all or part of the aggregated website presence information. Access controls are discussed in more detail below with reference to FIG. 10B. At 906, the aggregated website presence information that was not excluded by application of the one or more access controls is sent to one or more subscribers. Updated website presence information processing continues at 900. According to one embodiment of the present invention, the updated website presence information processing is performed at a predetermined interval.

FIG. 10A is a block diagram that illustrates a website object profile in accordance with one embodiment of the present invention. As shown in FIG. 10A, a website object profile comprises information related to a website object. By way of example, a website object profile may comprise an indication of one or more of the object's interests 1000 if the object represents a visitor to the website, or the visitor's contact information 1002.

The website object profile may also comprise an indication of the type of aggregated website presence information to exclude from display 1004 to the object if the object represents a visitor to the website. By way of example, indication 1004 may indicate that information about another website visitor's interests is not to be displayed to the website visitor associated with the website object profile.

A website object profile is maintained on a website visitor's processor. A website object profile may be updated by the website visitor. Additionally, a website visitor may authorize a website presence server to update the visitor's website object profile with information learned about the website visitor. By way of example, the website visitor may authorize a website presence server to update the visitor's website object profile to indicate how frequently the website visitor visits the website. As a further example, the website visitor may authorize a website presence server to update the visitor's website object profile to indicate the number of purchases made at the website during a particular period.

The website object profile may also comprise a privacy filter 1006 indicating website presence information not for publication. By way of example, privacy filter 1006 may indicate that information about the interests of the website visitor associated with the website object profile is not to be made available for publication to other objects of the website.

FIG. 10B is a block diagram that illustrates a website presence scheme in accordance with one embodiment of the present invention. A website presence scheme is specific to a particular website. As shown in FIG. 10B, a website presence scheme comprises an identification of the website presence information that is available from a particular website. By way of example, a website presence scheme may indicate that visitor website presence information is available, as well as aggregated website presence information (e.g. number of visitors currently visiting the website). A website presence scheme may also comprise an indication the method for deriving certain website presence information. By way of example, a website presence scheme may indicate that a website visitor's status may be set to "confused" if the website visitor's browsing activity includes frequently switching between a small number of web pages. A website presence scheme may also comprise one or more access controls for limiting access to all or part of the aggregated website presence information. By way of example, an access control may indicate that all or part of the aggregated website presence information should not be sent to one or more website objects. The determination to limit the website presence information to less than the website presence information subscribed to may be based on one or more factors, including whether the subscriber paid for the website presence information, whether the subscriber's interactions at the web site are determined to be objectionable, and whether the subscriber is determined to have violated a service agreement between the subscriber and the owner of the website presence information.

Figure 11:
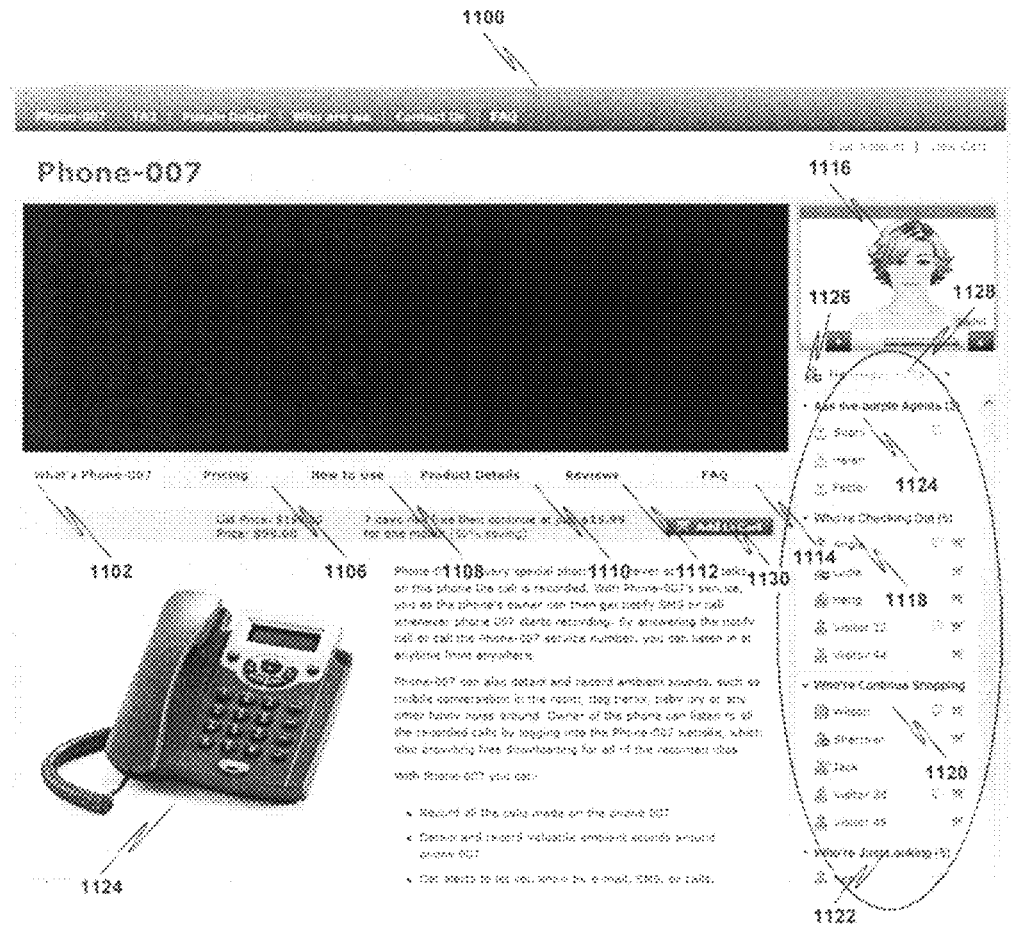
FIG. 11 is a block diagram that illustrates a user interface in a system for website presence in accordance with one embodiment of the present invention.

FIG. 11 is a block diagram that illustrates a user interface in a system for website presence in accordance with one embodiment of the present invention. As shown in FIG. 11, user interface 1100 comprises tabbed information regarding a product overview 1102, product pricing 1106, how to use the product 1108, product details 1110, product reviews 1112, and product frequently-asked-questions (FAQs) 1114. User interface 1100 also comprises a button 1130 for adding the product to the website visitor's shopping cart.

Still referring to FIG. 11, user interface 1100 also comprises an icon representing the website visitor 1126, and an indication of presence information for the website visitor 1128. Reference numeral 1124 indicates three website agents (Sophi, Helen, and Factor) that may be consulted regarding additional information about the website. The additional information may be provided via a recorded message. Alternatively, the additional information may be provided via a live chat session (e.g. text-based message exchange or voice chat) with an individual agent associated with the website. The balloon next to "Sophi" in section 1124 indicates a chat session between agent Sophi and another website visitor.

Still referring to FIG. 11, user interface 1100 also comprises an indication of other visitors currently visiting the same website, and the website presence information of the respective other visitors. Reference numeral 1118 indicates five website visitors ("Angie," "Lucie," "Heng," "Visitor 22," and "Visitor 44") with a website presence of "Checking out." Visitors "Angie," "Lucie," and "Heng," are registered visitors of the website, while visitors "Visitor 22" and "Visitor 44" are anonymous visitors of the website and have not registered with the website.

Reference numeral 1120 indicates five website visitors with a website presence of "Continue shopping." Reference numeral 1122 indicates one of five website visitors with a website presence of "Just looking."

The shopping cart icons indicated in 1118 and 1120 represent items a website visitor has decided to purchase. According to one embodiment of the present invention, a website visitor may click on the shopping cart icon associated with another website visitor to view the items in that other website visitor's shopping cart.

The balloons indicated next to "Angie" and "Visitor 22" in 1118, "Wilson" and "Visitor 38" in 1120, and "Ken" in 1122 indicate a current or past chat session between the respective website visitor and another website visitor, or between the respective website visitor and a website agent. According to one embodiment of the present invention, a website visitor may click on the balloon associated with a particular website visitor to view one or more chat sessions involving the particular website visitor.

Figure 12:
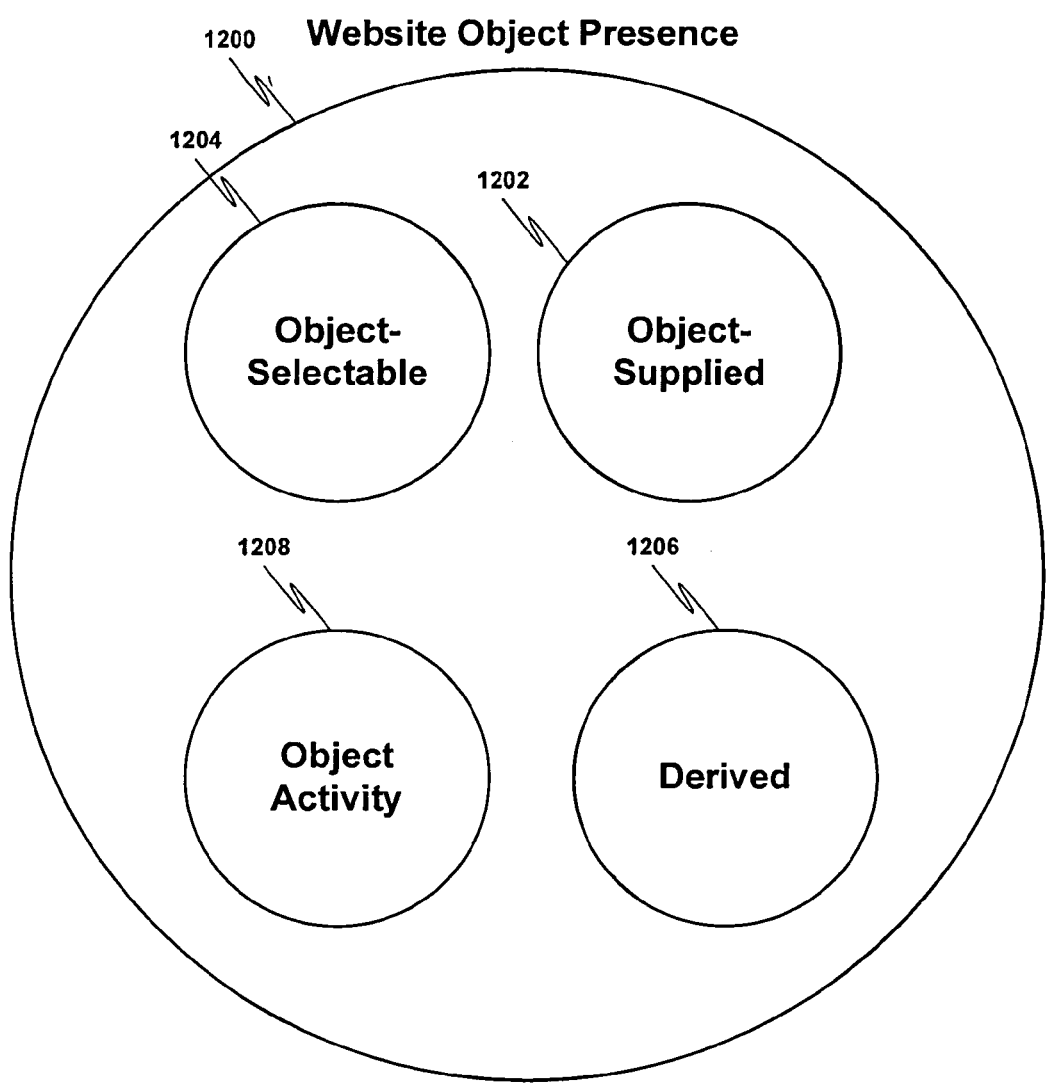
FIG. 12 is a block diagram that illustrates types of object website presence information in accordance with one embodiment of the present invention.

FIG. 12 is a block diagram that illustrates types of object website presence information in accordance with one embodiment of the present invention. According to one embodiment of the present invention, a website visitor selects from among multiple pre-configured website object presence information (1204). By way of example, a website visitor may be presented with a list of website object presence information such as ("Busy," "Available to chat," and "Idle"), and the website visitor may select one of the website object presence information options. According to another embodiment of the present invention, the website visitor supplies an indication of the visitor's presence information (1202). By way of example, a website visitor may define a website object presence information of "doing my homework," "vacationing in Bermuda," or "mowing the lawn." According to another embodiment of the present invention, website object presence information is based upon a website visitor's current activity (1208). By way of example, the website object presence information may be "checking out products," "in a demo," "talking to an agent," "been viewing the website for 43 minutes today," or "shopping cart contains one book by Robert Ludlum and one fondue set."

According to another embodiment of the present invention, the object's presence information is derived from information known about the website object (1206). Derived website presence information is explained in more detail below with reference to FIGS. 13B and 14.

FIG. 13A is a block diagram that illustrates multiple website objects and associated website presence information in accordance with one embodiment of the present invention. FIG. 13A represents an example snapshot of the current website presence information for website objects, where each object represents a website event or a website visitor. As shown in FIG. 13A, website 1300 comprises ten objects, including seven visitors (1302, 1314, 1306, 1316, 1310, 1318, and 1320). Objects 1304, 1308, and 1312 represent events taking place on the website 1300. Object 1312 represents a live video session event, object 1304 represents a live question-and-answer session event, and object 1308 represents a live demonstration session. Each of the objects is associated with website presence information indicated by the quoted information below the respective objects.

Depending on how a website owner chooses to implement a website presence service as specified in the website presence scheme, each website presence information shown in FIG. 13A could be the result of a website visitor or event selecting from among multiple pre-configured website object presence information, as discussed above regarding reference numeral 1204 of FIG. 12. In other words, if a website presence scheme indicates that a website visitor or event may select a website presence from a list of website presence information that includes the ones indicated in FIG. 13A, a website visitor or event would be able to select a particular one of those listed.

Alternatively, each website presence information shown in FIG. 13A could be the result of a website visitor or event supplying an indication of the visitor's or event's presence information, as discussed above regarding reference numeral 1202 of FIG. 12. Thus, if a website presence scheme indicates that a website visitor or event may supply an indication of the visitor's or event's presence information, a website visitor or event would be able to indicate any of the particular website presence information illustrated in FIG. 13A, or any other website presence information that the website visitor desires.

Website presence information shown by reference numeral 1320 ("In a Demo") in FIG. 13A could based upon a website visitor's current activity, as discussed above regarding reference numeral 1208 of FIG. 12. Website presence information shown by reference numeral 1318 ("Confused") in FIG. 13A could be derived from information known about the website object, as discussed above regarding reference numeral 1206 of FIG. 12.

According to one embodiment of the present invention, a website object my have multiple presence states simultaneously. By way of example, a website object may have the presence states "Viewing pages" and "Ready to interact" simultaneously. As a further example, a website object may have the presence states "Just looking" and "Browsing website for 45 minutes" simultaneously.

FIG. 13B is a block diagram that illustrates multiple kinds of website presence information in accordance with one embodiment of the present invention. Each of the particular website presence information shown in FIG. 13B may be selected by a website object, provided by the website object, or derived based on other information known about the website object. Example website presence information associated with a website visitor is shown at reference numeral 1324. Example website presence information associated with a website event is shown at reference numeral 1326.

Figure 14:
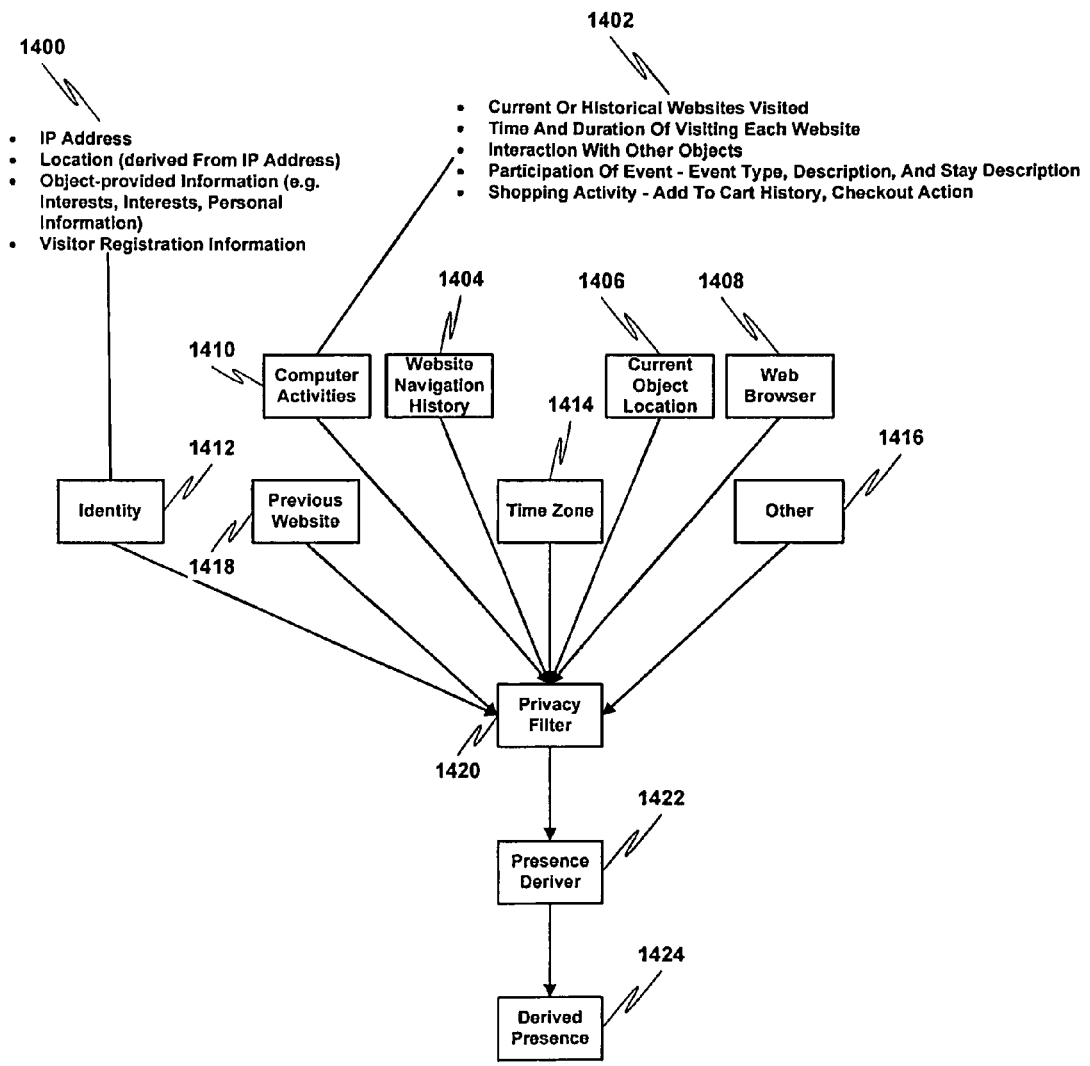
FIG. 14 is a block diagram that illustrates derived website presence information in accordance with one embodiment of the present invention.

FIG. 14 is a block diagram that illustrates derived website presence information in accordance with one embodiment of the present invention. As shown in FIG. 14, a website presence deriver 1422 is configured to derive website presence 1424 based at least in part on an analysis of information associated with the website object and not excluded by a privacy filter associated with the website object. The information about the website object may comprise the website object's identity 1412, the website last visited by the website visitor 1418 if the website object represents a website visitor, the website object's time zone 1414, computer activities performed by the website object 1410, the website visitor's navigation history if the website object represents a website visitor, the website object's current location, the particular Web browser used by the website visitor 1408 (e.g., Microsoft Internet Explorer™, Firefox®, or Safari™) if the website object represents a website object, and other information about the website object 1416.

By way of example, a vendor website visitor's presence may be set to "confused" if the website visitor swaps repeatedly between two different product information pages.

Examples of information for use in determining a website object's identity 1412 include the website object's IP address, location, and information provided by the website object. Visitor registration information may also be used to determine a website object's identity, if the visitor registered. Example computer activities 1410 that may be used in deriving a website object's website presence comprise the current or previous websites visited by the website visitor if the website object represents a website visitor, the time and duration of each visit to the current or previous websites, interaction with other website objects, the website visitor's participation in other website events, and the website visitor's shopping activity.

According to one embodiment of the present invention, the website presence of an event is based at least in part on the event's explicit status and website visitor participation in the event. By way of example, if the event's explicit status was "Opens at 7 PM" and the number of participants signed up for the event exceeds a predetermined number, the event's website presence may be assigned a value of "Hot Event."

Figure 15:
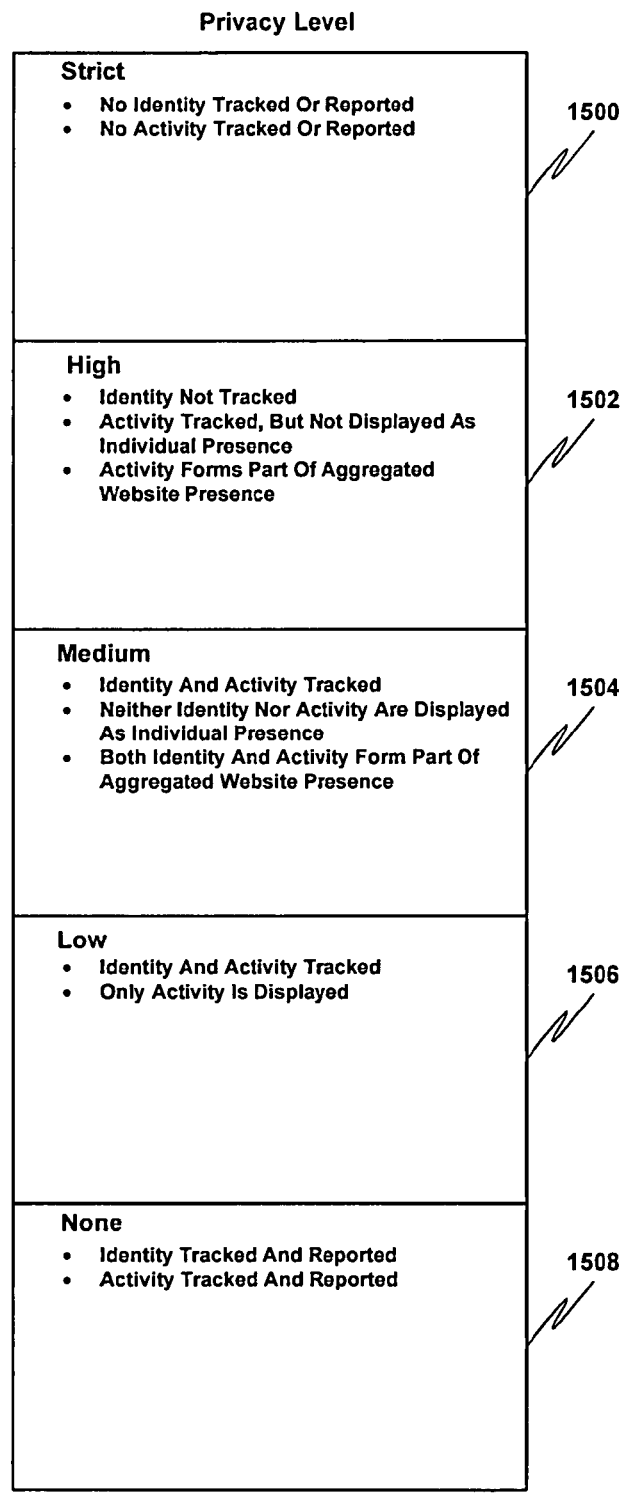
FIG. 15 is a block diagram that illustrates privacy levels in accordance with one embodiment of the present invention.

FIG. 15 is a block diagram that illustrates privacy levels in accordance with one embodiment of the present invention. As shown in FIG. 15, various privacy levels may be implemented to determine information about website objects that is tracked or reported to a website presence server. The various privacy levels may be specified in a privacy filter associated with a website object. A website visitor may have different privacy filters for different websites. According to one embodiment of the present invention, both website object identity and activity are tracked and reported 1508. According to another embodiment of the present invention, website object identity and activity are tracked, but only website object activity is displayed 1506. According to another embodiment of the present invention, website object identity and activity are tracked, neither website object identity nor website object activity are displayed as individual presence, and both website object identity and website object activity form part of an aggregated website presence 1504. According to another embodiment of the present invention, website object identity is not tracked, website object activity is tracked but is not displayed as individual presence, and website object activity forms part of an aggregated website presence 1502. According to another embodiment of the present invention, neither website object identity nor website object activity is tracked or reported 1500.

FIGS. 16-19 illustrate cross-website presence collaboration in accordance with example embodiments of the present invention. A website owner subscribes to the website presence information of one or more other affiliated websites, and agrees to provide website presence information to the one or more other affiliated websites.

Figure 16:
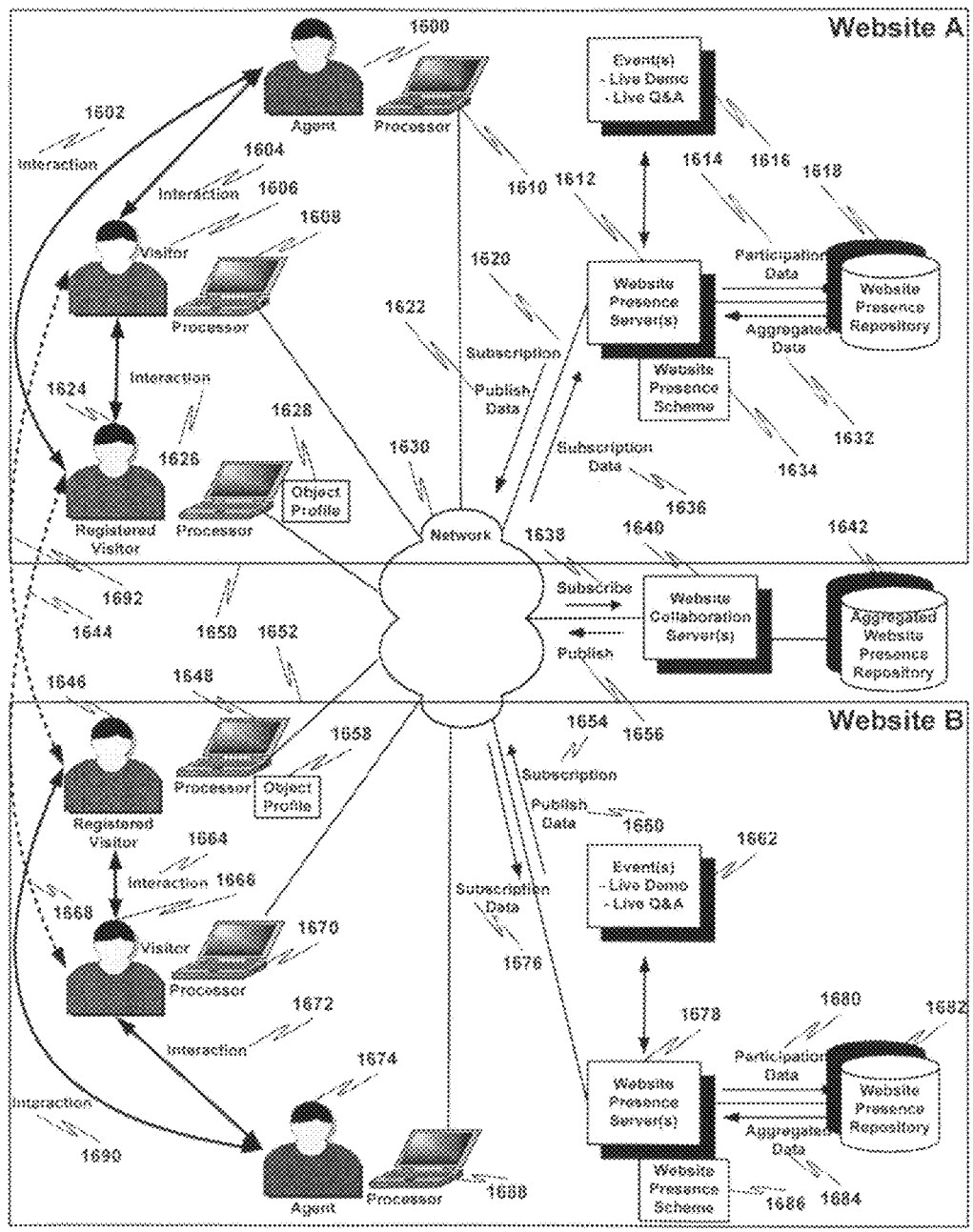
FIG. 16 is a block diagram that illustrates a system for cross-website presence collaboration in accordance with one embodiment of the present invention.

FIG. 16 is a block diagram that illustrates a system for cross-website presence collaboration in accordance with one embodiment of the present invention. As shown in FIG. 16, a system for cross-website presence collaboration comprises one or more collaboration servers 1640 communicably coupled to an aggregated website presence repository 1642 and to one or more website presence servers (1612, 1678), where each of the website presence servers (1612, 1678) is associated with a different website. The one or more website presence servers (1612, 1678) are configured to publish aggregated website presence information for a particular website to a first one or more other websites, receive aggregated website presence information from a second one or more other websites according to a subscription, optionally apply one or more access controls to the received aggregate website presence information, and send the received aggregated website presence information that was not excluded to one or more subscribers. The one or more collaboration servers 1640 are configured to receive aggregated website presence information from a first one or more websites, optionally apply one or more access controls to the aggregated website presence information to potentially limit access to all or part of the website presence information, and publish the received aggregated website presence information that was not excluded by application of the one or more access controls. The aggregated website presence information may be stored in aggregated website presence repository 1642. Alternatively, the aggregated website presence information may be kept in a cache associated with the one or more collaboration servers 1640.

According to one embodiment of the present invention, the one or more collaboration servers 1640 are further configured to monitor traffic through the one or more collaboration servers 1640 to detect undesirable activity and implement appropriate corrective measures. Example undesirable activity may include resource hogging by a particular one or more subscribers. Corrective measures may include suspending or halting delivery to particular one or more subscribers The presence information may be used to facilitate interaction between one or more of event objects (1616, 1662), registered visitors (1624, 1646), anonymous visitors (1606, 1666), and agents (1600, 1674). Website visitors visiting the same website may still interact as described above with respect to other embodiments. In addition, website visitors of a particular website may interact with objects of one or more other affiliated websites. As shown in FIG. 16, visitors of website A 1650 may interact with each other. Specifically, an interaction between agent 1600 via processor 1610 and registered visitor 1624 via processor 1628 is shown at reference numeral 1602. An interaction between agent 1600 via processor 1610 and anonymous visitor 1606 via processor 1608 is shown at reference numeral 1604. An interaction between anonymous visitor 1606 via processor 1608 and registered visitor 1624 via processor 1628 is shown at reference numeral 1626.

Likewise, visitors of website B 1652 may interact with each other. Specifically, an interaction between agent 1674 via processor 1688 and registered visitor 1646 via processor 1646 is shown at reference numeral 1690. An interaction between agent 1674 via processor 1688 and anonymous visitor 1666 via processor 1670 is shown at reference numeral 1672. An interaction between anonymous visitor 1666 via processor 1670 and registered visitor 1646 via processor 1648 is shown at reference numeral 1664.

Additionally, visitors of different websites may interact with each other. An interaction between website A 1650 anonymous visitor 1606 via processor 1608 and website B registered visitor 1646 via processor 1648 is shown at reference numeral 1692. An interaction between website A 1650 registered visitor 1624 via processor 1628 and website B 1652 anonymous visitor 1666 via processor 1670 is shown at reference numeral 1644.

Figure 17:
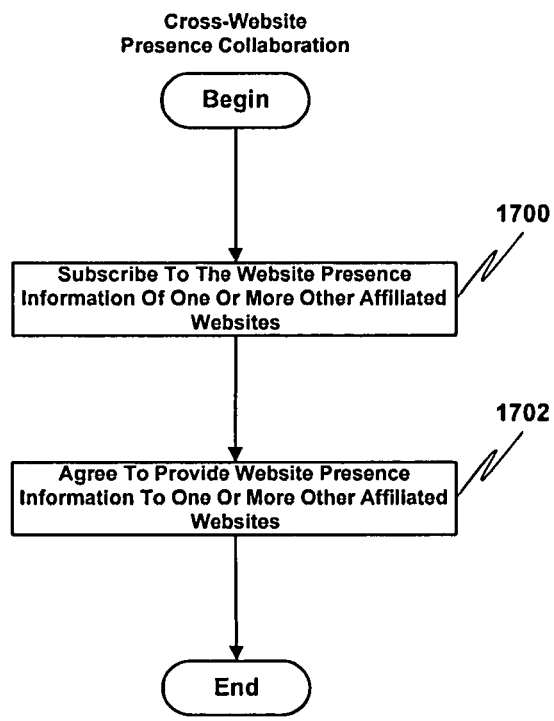
FIG. 17 is a high-level flow diagram that illustrates a method for cross-website presence collaboration in accordance with one embodiment of the present invention.

FIG. 17 is a high-level flow diagram that illustrates a method for cross-website presence collaboration in accordance with one embodiment of the present invention. The processes illustrated in FIG. 17 may be implemented in hardware, software, firmware, or a combination thereof. At 1700, a website owner subscribes to the website presence information of one or more other affiliated websites. At 1702, an agreement to provide website presence information to the one or more other affiliated websites is made.

Figure 18:
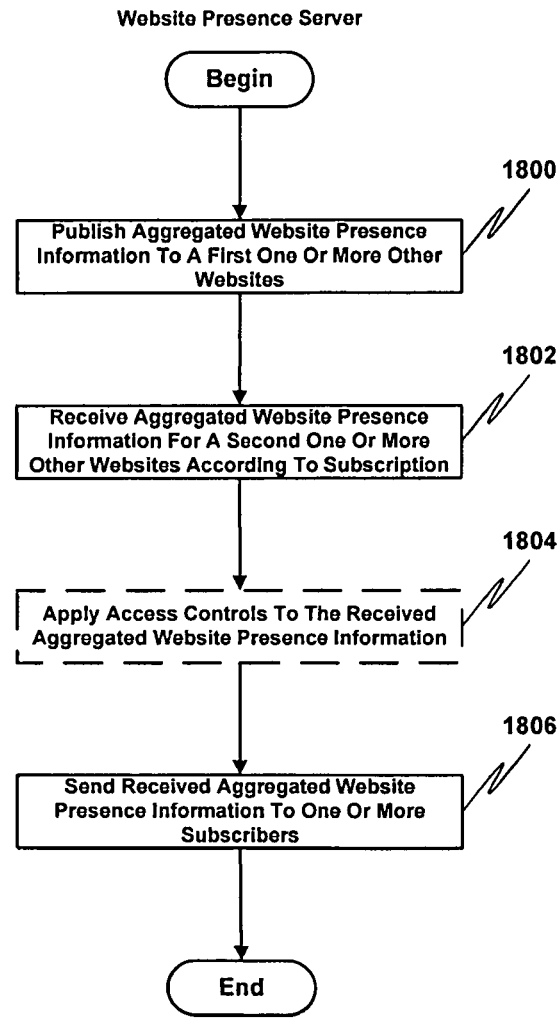
FIG. 18 is a high-level flow diagram that illustrates a method for cross-website presence collaboration from the perspective of a website owner in accordance with one embodiment of the present invention.

FIG. 18 is a high-level flow diagram that illustrates a method for cross-website presence collaboration from the perspective of a website owner in accordance with one embodiment of the present invention. The processes illustrated in FIG. 18 may be implemented in hardware, software, firmware, or a combination thereof. At 1800, aggregated website presence information for a particular website is published to a first one or more other websites according to a subscription. The aggregated website presence information may be published to the one or more other websites via a collaboration server that collects website presence information from multiple websites and distributes the information according to subscriptions for the information. At 1802, aggregated website presence information is received from a second one or more other websites according to a subscription. The aggregated website presence information may be received from the collaboration server described previously. According to one embodiment of the present invention, the first one or more other websites and the second one or more other websites are the same.

Still referring to FIG. 18, at 1804, one or more access controls are optionally applied to the received aggregated website presence information, potentially limiting access to all or part of the received aggregated website presence information. At 1806, the received aggregated website presence information that was not excluded by application of the one or more access controls is sent to one or more subscribers.

Figure 19:
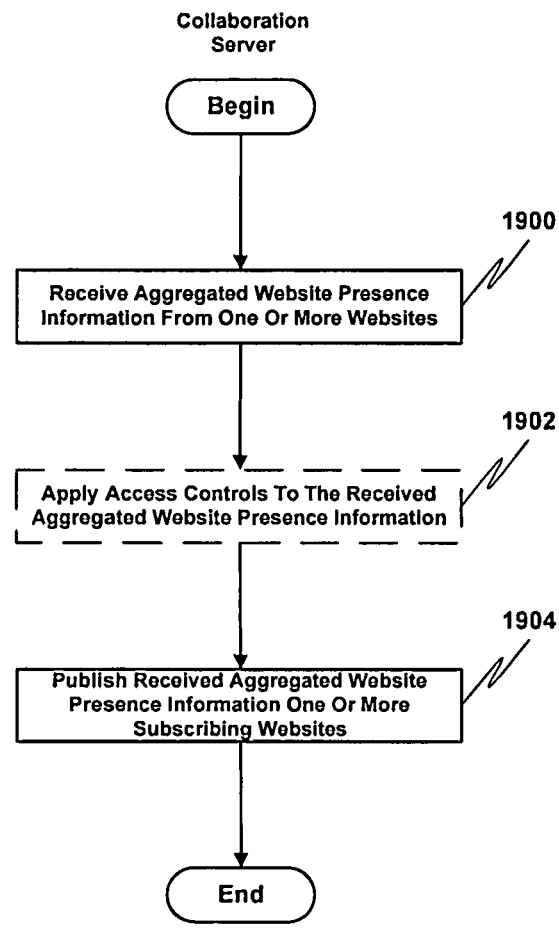
FIG. 19 is a high-level flow diagram that illustrates a method for cross-website presence collaboration from the perspective of a collaboration server in accordance with one embodiment of the present invention.

FIG. 19 is a high-level flow diagram that illustrates a method for cross-website presence collaboration from the perspective of a collaboration server in accordance with one embodiment of the present invention. The processes illustrated in FIG. 19 may be implemented in hardware, software, firmware, or a combination thereof. At 1900, aggregated website presence information from a first one or more subscribing websites is received. At 1902, one or more access controls are optionally applied to the aggregated website presence information, potentially limiting access to all or part of the website presence information. At 1904, the received aggregated website presence information that was not excluded by application of the one or more access controls is published to one or more subscribing websites. According to one embodiment of the present invention, the first one or more websites and the one or more subscribing websites are the same.

According to one embodiment of the present invention, the interaction allowed between website objects is context-sensitive. By way of example, an action list may indicate a website visitor can join only an event with an "Open" presence. As a further example, a "Chat" action may be disabled while the website visitor is "just looking."

According to one embodiment of the present invention, website presence information comprises aggregated information regarding web page viewing activities of a website, such as the current most-viewed page, the most-viewed page in a past time period, the current most-viewed product, and the most-viewed product in a past time period, the current most-purchased items, the most-purchased items an a past period, and the most popular item currently in people's shopping carts. The past time period may be, for example, 24 hours, 7 days, or 30 days.

Figure 20:
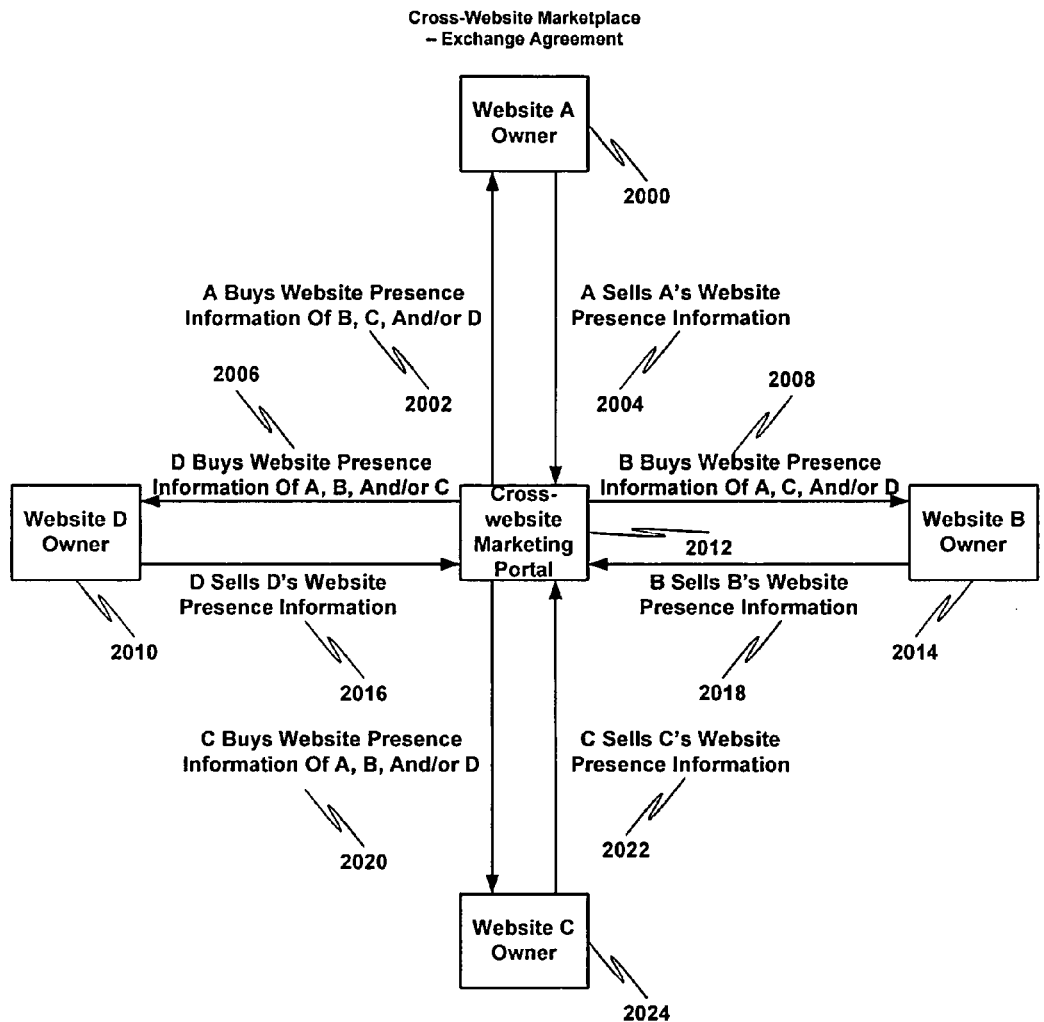
FIG. 20 is a block diagram that illustrates agreements to exchange website presence information in a cross-website marketplace in accordance with one embodiment of the present invention.
Figure 21:
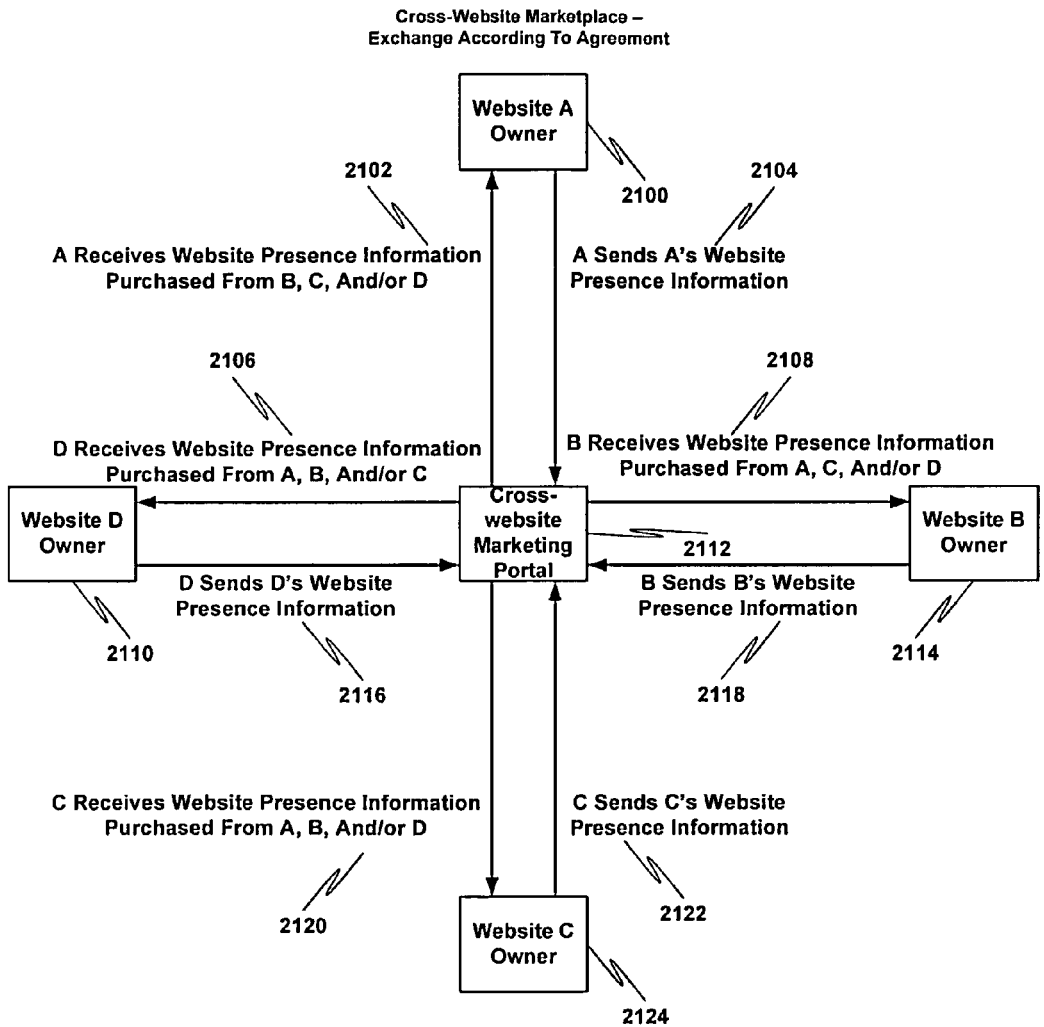
FIG. 21 is a block diagram that illustrates exchanging website presence information based on agreements to exchange website presence information in a cross-website marketplace in accordance with one embodiment of the present invention.

FIGS. 20-25B illustrate exchanging website presence information in a cross-website presence marketplace in accordance with embodiments of the present invention. A cross-website marketing portal interfaces between website presence information buyers and website presence information sellers to facilitate the exchange of website presence information FIGS. 20 and 21 are block diagrams that illustrate exchanging website presence information in a cross-website marketplace in accordance with one embodiment of the present invention. FIG. 20 illustrates making agreements to exchange website presence information in a cross-website marketplace, and FIG. 21 illustrates exchanging website presence information based on the agreements. While four website owners are illustrated in FIGS. 20 and 21, embodiments of the present invention apply to any number of website owners. As shown in FIG. 20, a cross-website marketing portal 2012 is configured to facilitate agreements for exchange of website presence information between website presence information buyers and website presence information sellers. Each of website owners 2000, 2010, 2014, and 2024 may be a buyer of website presence information, a seller of website presence information, or both. As shown in FIG. 21, a cross-website marketing portal 2112 is also configured to facilitate the exchange of the website presence information in accordance with agreements made to exchange the website presence information discussed above with respect to FIG. 20.

In more detail, cross-website marketing portal 2112 is configured to publish one or more website presence information catalogs. Each of the one or more website presence information catalogs lists one or more groupings of website presence information for sale from a particular website. Cross-website marketing portal 2112 is further configured to receive website presence information from one or more websites associated with the one or more website presence information catalogs. Cross-website marketing portal 2112 is further configured to send website presence information to one or more buyers of the website presence information.

According to another embodiment of the present invention, cross-website marketing portal 2112 is further configured to receive one or more payments from the one or more buyers and send the one or more payments to one or more sellers of the website presence information sent to the one or more buyers.

According to another embodiment of the present invention, payments are made using a monetary currency (e.g., euros or U.S. dollars). According to another embodiment of the present invention, payments are made using a virtual money system, where a buyer buys website presence information using credits, and a seller earns credits for selling its website presence information.

A processor associated with a website owner (2100, 2110, 2114, 2120) is configured to publish a website presence information catalog listing one or more groupings of website presence information for sale. According to one embodiment of the present invention, the processor is configured to publish the website presence information catalog listing via cross-marketing portal 2112. The processor is further configured to receive one or more offers for the one or more groupings. The processor is further configured to accept at least one of the one or more offers from one or more buyers. The processor is further configured to send website presence information to the one or more buyers.

According to another embodiment of the present invention, the processor is further configured to receive one or more payments from the one or more buyers and send the one or more payments to one or more sellers of the website presence information sent to the one or more buyers.

Figure 22:
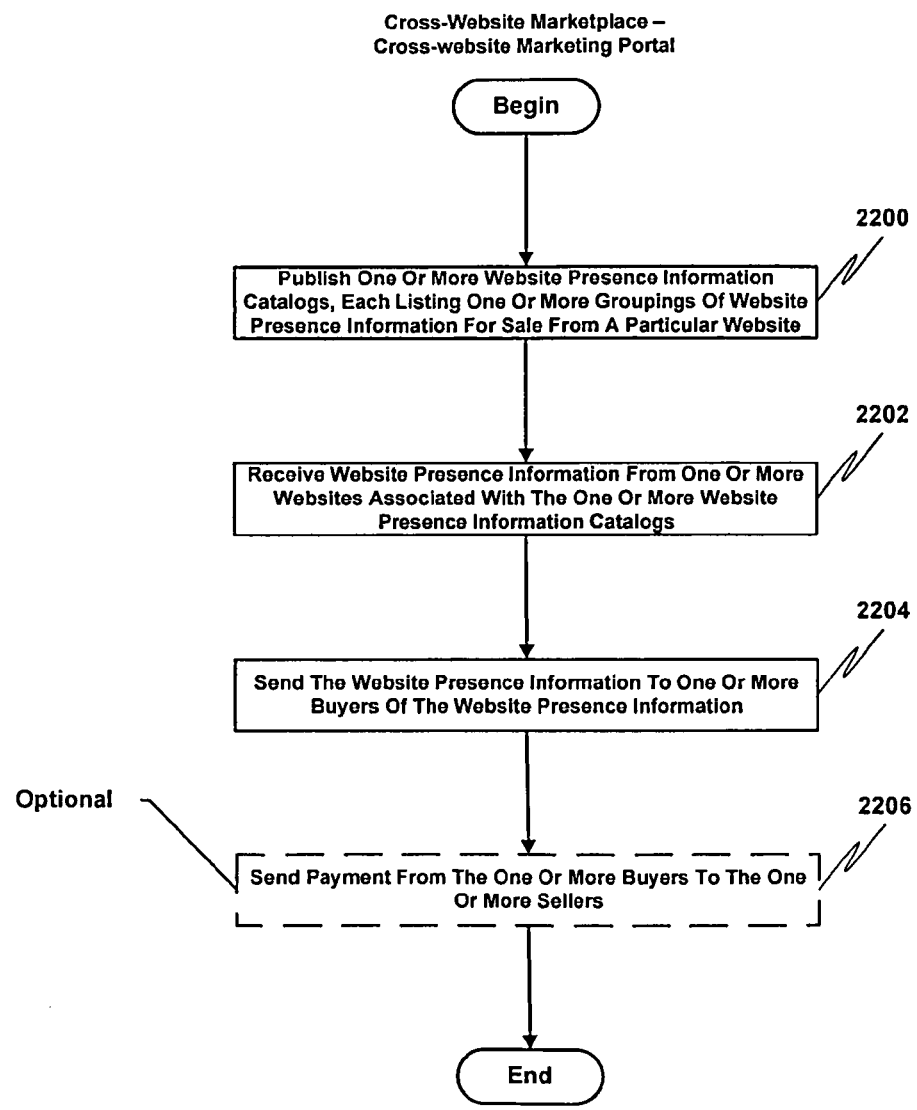
FIG. 22 is a flow diagram that illustrates a method for cross-website marketing from the perspective of a cross-website marketing portal in accordance with one embodiment of the present invention.

FIG. 22 is a flow diagram that illustrates a method for cross-website marketing from the perspective of a cross-website marketing portal in accordance with one embodiment of the present invention. The processes illustrated in FIG. 22 may be implemented in hardware, software, firmware, or a combination thereof. At 2200, one or more website presence information catalogs, each listing one or more groupings of website presence information for sale from a particular website, are published. At 2202, website presence information from one or more websites associated with the one or more website presence information catalogs is received. At 2204, website presence information is sent to one or more buyers of the website presence information. At 2206, payments received from the one or more buyers is optionally sent to the one more sellers. Alternatively, the one or more buyers may pay the one or more sellers directly, with out involvement of the cross-website marketing portal.

Figure 23:
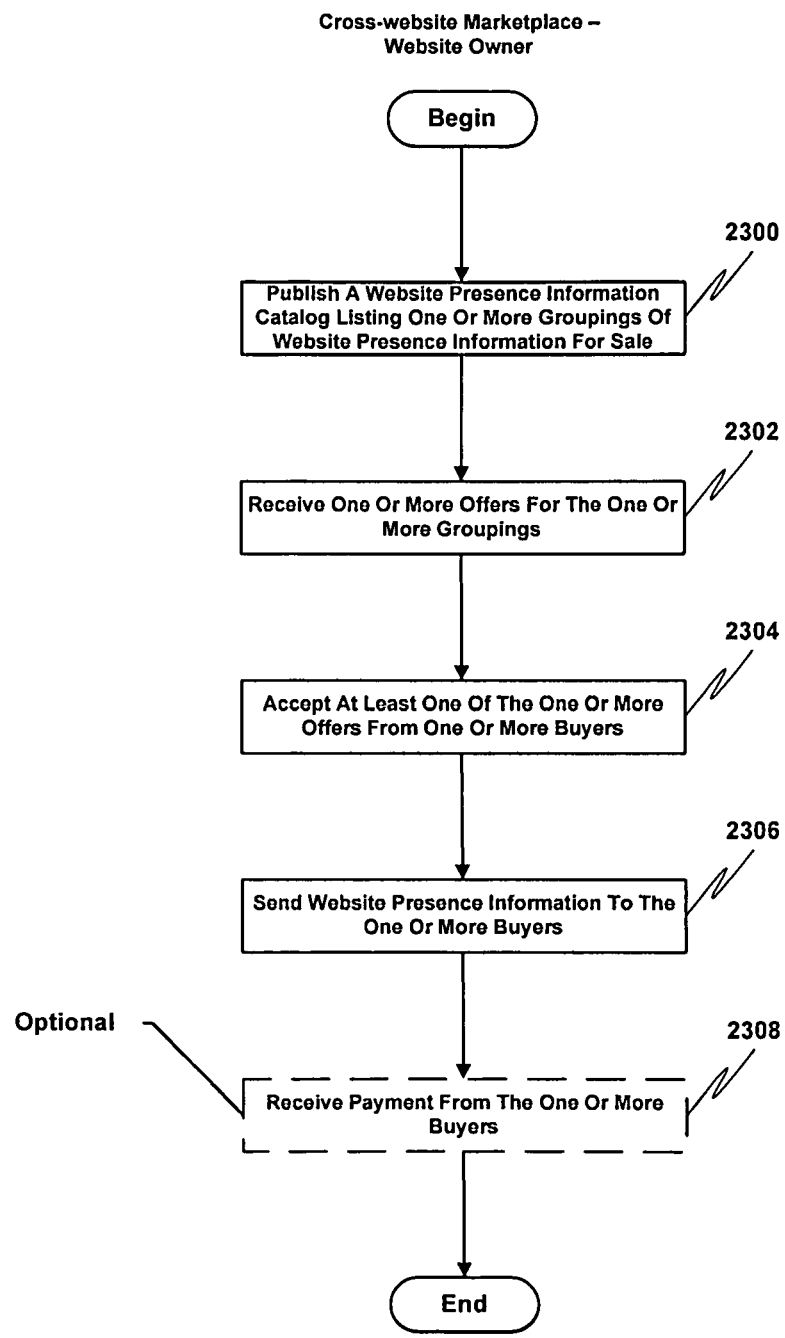
FIG. 23 is a flow diagram that illustrates a method for cross-website marketing from the perspective of a website owner in accordance with one embodiment of the present invention.

FIG. 23 is a flow diagram that illustrates a method for cross-website marketing from the perspective of a website owner in accordance with one embodiment of the present invention. The processes illustrated in FIG. 23 may be implemented in hardware, software, firmware, or a combination thereof. At 2300, a website presence information catalog listing one or more groupings of website presence information for sale is published. According to one embodiment of the present invention, the website presence information catalog is published via a cross-website marketing portal. At 2302, one or more offers for the one or more groupings are received. At 2304, at least one of the one or more offers are accepted from one or more buyers. At 2306, website presence information is sent to the one or more buyers. At 2308, payment is optionally received from the cross-website marketing portal for the website presence information sent to the one or more buyers. Alternatively, payment is received directly from the one or more buyers without involvement of the cross-website marketing portal.

Figure 24:
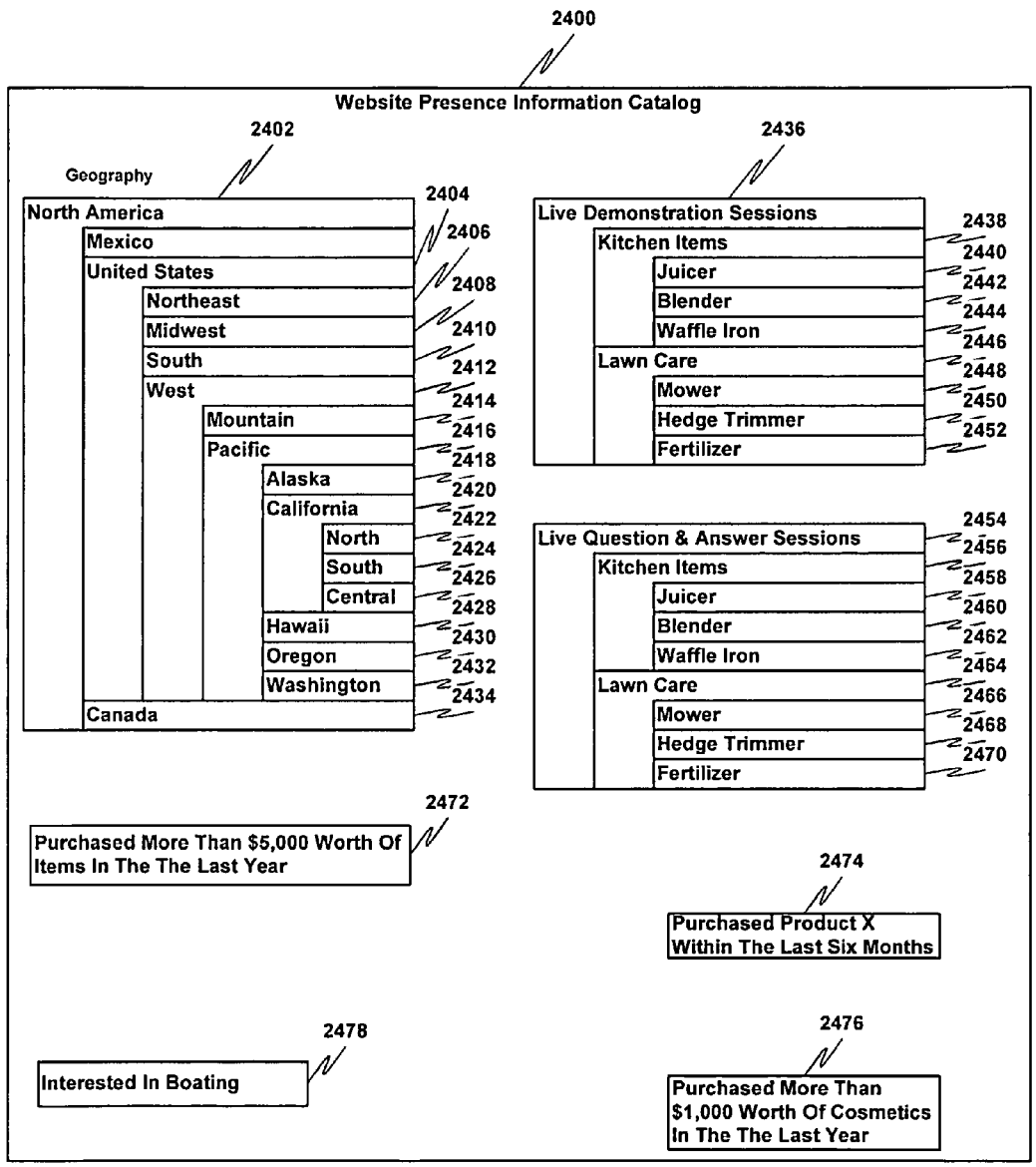
FIG. 24 is a block diagram that illustrates a website presence information catalog in accordance with one embodiment of the present invention.
Figure 25:
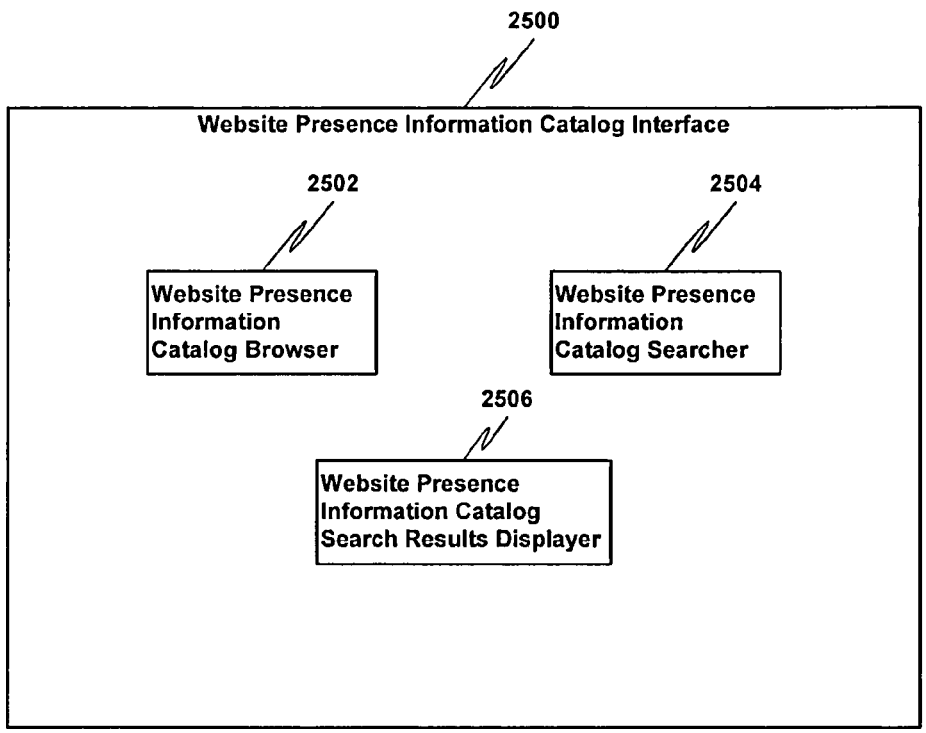
FIG. 25A is a block diagram that illustrates a website presence information catalog interface in accordance with one embodiment of the present invention.
FIG. 25B is a block diagram that illustrates a website presence information catalog entry description in accordance with one embodiment of the present invention.
FIG. 25C is a block diagram that illustrates a website presence information catalog entry description for auctioned website presence information in accordance with one embodiment of the present invention.
Figure 25:
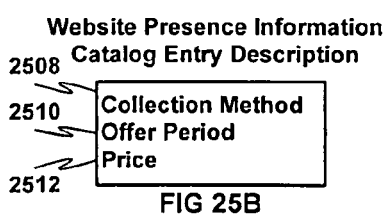
Figure 25:
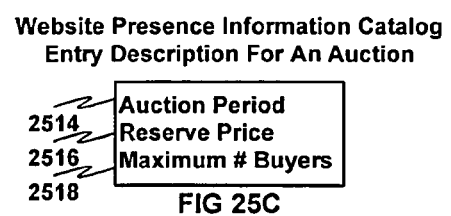

FIG. 24 is a block diagram that illustrates a website presence information catalog in accordance with one embodiment of the present invention. As shown in FIG. 24, website presence information catalog 2400 comprises multiple website presence information selections (2402-2476) available for purchase.

According to one embodiment of the present invention, a website presence information catalog comprises website presence selections at multiple levels of granularity. According to another embodiment of the present invention, entries in a website presence information catalog are categorized based at least in part on the geographic region that registered website visitors are from. Both of these embodiments are illustrated at reference numerals 2402-2434. For example, a buyer of selection 2472 would be entitled to receive website presence information from all registered visitors of the website that are from North America. At a lower level of granularity, a buyer of selection 2404 would be entitled to receive website presence information from all registered visitors of the website that are from the United States. At a still lower level of granularity, a buyer of selection 2412 would be entitled to receive website presence information from all registered visitors of the website that are from the Western region of the United States.

According to another embodiment of the present invention, entries in a website presence information catalog are categorized based at least in part on a monetary amount spent by registered website visitors at the website. For example, a buyer of selection 2402 would be entitled to receive website presence information from all registered visitors that purchased more than $5,000 worth of items from the website during the last year.

According to another embodiment of the present invention, entries in a website presence information catalog are categorized based at least in part on whether registered website visitors purchased a particular product at the website. According to a further embodiment of the present invention, entries in a website presence information catalog are categorized based at least in part on whether registered website visitors purchased a particular product at the website within a specified period. For example, a buyer of selection 2474 would be entitled to receive website presence information from all registered visitors that purchased product "X" within the last six months.

According to another embodiment of the present invention, entries in a website presence information catalog are categorized based at least in part on a monetary amount spent on a particular product type at the website. For example, a buyer of selection 2476 would be entitled to receive website presence information from all registered visitors that purchased more than $1,000 worth of cosmetics in the last year.

According to another embodiment of the present invention, entries in a website presence information catalog are categorized based at least in part on one or more interests of registered website visitors. For example, a buyer of selection 2478 would be entitled to receive website presence information from all registered visitors that indicated an interest in boating.

According to another embodiment of the present invention, entries in a website presence information catalog are categorized based at least in a website event type. For example, a buyer of selection 2436 would be entitled to receive website presence information for all live demonstration sessions at a website (2438-2452), and a buyer of selection 2444 would be entitled to receive website presence information for all live waffle iron demonstration sessions at the website. Likewise, a buyer of selection 2454 would be entitled to receive website presence information for all live question and answer sessions at the website (2456-2470), and a buyer of selection 2468 would be entitled to receive website presence information for all hedge trimmer live question and answer sessions at the website.

FIG. 25A is a block diagram that illustrates a website presence information catalog interface in accordance with one embodiment of the present invention. As shown in FIG. 25A, website presence information catalog interface 2500 comprises a website presence data catalog browser 2502, a website presence information catalog searcher 2504, and a website presence information catalog search results displayer 2506. Website presence information catalog browser 2502 is configured to present website presence information catalog entries to an individual based on input from the individual, and to accept an individual's selection of one or more website presence information entries. Website presence information catalog searcher 2504 is configured to search for website presence information catalog entries based upon search criteria entered by the individual. Website presence information catalog search results displayer 2506 is configured to display search results from the website presence information catalog searcher 2504.

FIG. 25B is a block diagram that illustrates a website presence information catalog entry description in accordance with one embodiment of the present invention. FIG. 25B illustrates information regarding website presence information catalog entries for display to an individual looking for website presence information using website presence information catalog browser 2502 or website presence information catalog searcher 2504. According to one embodiment of the present invention, a website presence information catalog entry description includes an indication of the method used to collect the web presence information (2508). By way of example, an entry description may indicate the web presence information is updated once per second.

According to another embodiment of the present invention, a website presence information catalog entry description includes an indication of the entry's offer period (2510). By way of example, an entry description may indicate the offer is for site presence data from June 1 to August 31 of the current year. As a further example, an entry description may indicate the offer is for site presence data starting immediately and continuing for three months.

According to another embodiment of the present invention, a website presence information catalog entry description includes a price for receipt of the website presence information corresponding to the entry (2512). The price may be based on a flat fee. For example, the price may be fixed for a predetermined period, regardless of the amount of website presence information delivered to a buyer. Alternatively, the price may be based on a metered fee, where the price is based on the amount of website presence information delivered to the buyer.

According to one embodiment of the present invention, a buyer pays in advance. According to another embodiment of the present invention, a buyer pays after the website presence information is delivered.

FIG. 25C is a block diagram that illustrates a website presence information catalog entry description for auctioned website presence information in accordance with one embodiment of the present invention. According to this embodiment of the present invention, a cross-website marketing portal is further configured to exchange website presence information via an auction. A seller of website presence information may include in its website presence information catalog entry description, an identification of the auction period. For example, the entry description may indicate an auction for the website presence information started two hours ago and will end in 15 minutes. The entry description may also include an indication of a reserve price, i.e. the lowest price acceptable to the seller. The entry description may also include an indication of the maximum number of buyers. According to this embodiment of the present invention, buyers submit bids or offers until the end of the auction period 2514. The website presence information is sold to the buyers with highest bids that are at least as much as the reserve price 2516. If there number of bids at or above the reserve price 2514 exceeds the maximum number of buyers 2518, the website presence information is sold to the N bidders with the highest bids, where N equals the maximum number of buyers 2518.

The information represented in FIGS. 25B and 25C are merely examples of information that may be stored in a website presence information catalog entry description. A particular website presence information catalog entry description may include all or part of the information illustrated in FIG. 25B, FIG. 25C, or both. A particular website presence information catalog entry description may also include other information not shown in FIGS. 25B and 25C.

According to one embodiment of the present invention, a cross-website marketing portal is configured to maintain one or more payment accounts for buyers of website presence information and for sellers of website presence information.

While embodiments and applications of this invention have been shown and described with respect to website presence, embodiments of the present invention apply more broadly to presence on any type of computer network, including the Internet or a LAN communicatively coupled using protocols including, for example, HTTP, SIP, and FTP.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method implemented on one or more systems having one or more processors and memory, the method comprising:
   at said one or more systems having one or more processors and memory:
   collecting visitor website presence information based on at least one of object-selectable information selected by a one or more website objects, object-supplied information provided by the one or more website objects, and derived information derived from information known about the one or more website objects;
   applying a privacy filter to the visitor website presence information to create filtered visitor website presence information;
   sending the filtered visitor web site presence information to one or more web site presence servers;
   receiving aggregated website presence information from the one or more website presence servers; and
   presenting the aggregated website presence information based at least in part on a website object profile for a visitor to the website.

2. The method of claim 1, further comprising repeating the collecting, applying, sending, receiving, and presenting until the visitor leaves the website.

3. The method of claim 1 wherein the website object profile comprises an indication of one or more interests of the object.

4. The method of claim 1 wherein the website object profile comprises an indication of contact information of the object.

5. The method of claim 1 wherein the website object profile comprises an indication of the type of aggregated website presence information to exclude from display to the object.

6. The method of claim 1 wherein the website object profile comprises a privacy filter indicating website presence information not for publication to other objects of the website.

7. The method of claim 1 wherein the visitor website presence information is further based at least in part on activity of the one or more objects at the website.

8. The method of claim 1, wherein the visitor website presence information indicates one or more of:
   a state of a website object regarding its participation in a communication session;
   an ability of the website object to participate in a communication session; and
   a willingness of the website object to participate in a communication session.

9. The method of claim 1, wherein the website presence information is based at least in part on a website visitor's current activity.

10. The method of claim 9, wherein the website presence information indicates one or more of:
    the website visitor is currently in a demo;
    the website visitor is currently "just looking";
    the website visitor is currently "shopping"; and
    the website visitor is currently "checking out".

11. The method of claim 1, wherein the visitor website presence information is derived from information known about a website object by a website presence deriver.

12. The method of claim 11, wherein the visitor website presence information derived from information known about a website object indicates a website visitor is confused.

13. The method of claim 1, wherein the visitor website presence information comprises information regarding a product that a first website visitor visiting the website is considering for purchase.

14. The method of claim 13, wherein the information regarding the product is viewable by a second website visitor visiting the website.

15. The method of claim 1, wherein applying the privacy filter to the visitor website presence information includes the privacy filter specifying how the visitor website presence information is collected, and which of the visitor website presence information is made available for viewing by other website visitors visiting the website.

16. An apparatus comprising:
a memory; and
a processor configured to:
collect visitor website presence information based on at least one of object-selectable information selected by a one or more website objects, object-supplied information provided by the one or more website objects, and derived information derived from information known about the one or more website objects;
apply a privacy filter to the visitor website presence information to create filtered visitor website presence information;
send the filtered visitor website presence information to one or more website presence servers;
receive aggregated website presence information from the one or more website presence servers; and
present the aggregated website presence information based at least in part on a website object profile for a visitor to the website.

17. The apparatus of claim 16 wherein the processor is further configured to repeat the collecting, applying, sending, receiving, and presenting until the visitor leaves the website.

18. The apparatus of claim 16 wherein the website object profile comprises an indication of one or more interests of the object.

19. The apparatus of claim 16 wherein the website object profile comprises an indication of contact information of the object.

20. The apparatus of claim 16 wherein the website object profile comprises an indication of the type of aggregated website presence information to exclude from display to the object.

21. The apparatus of claim 16 wherein the website object profile comprises a privacy filter indicating website presence information not for publication to other objects of the website.

22. The apparatus of claim 16 wherein the visitor website presence information is further based at least in part on activity of the one or more objects at the website.

23. The apparatus of claim 16, wherein the visitor website presence information indicates one or more of:
a state of a website object regarding its participation in a communication session;
an ability of the website object to participate in a communication session; and
a willingness of the website object to participate in a communication session.

24. The apparatus of claim 16, wherein the website presence information is based at least in part on a website visitor's current activity.

25. The method of claim 24, wherein the website presence information indicates one or more of:
the website visitor is currently in a demo;
the website visitor is currently "just looking";
the website visitor is currently "shopping"; and
the website visitor is currently "checking out."

26. The apparatus of claim 16, wherein the visitor website presence information is derived from information known about a website object by a website presence deriver.

27. The apparatus of claim 26, wherein the visitor website presence information derived from information known about a website object indicates a website visitor is confused.

28. The apparatus of claim 16, wherein the visitor website presence information comprises information regarding a product that a first website visitor visiting the website is considering for purchase.

29. The apparatus of claim 28, wherein the information regarding the product is viewable by a second website visitor visiting the website.

30. The apparatus of claim 16, wherein applying the privacy filter to the visitor website presence information includes the privacy filter specifying how the visitor website presence information is collected, and which of the visitor website presence information is made available for viewing by other website visitors visiting the website.

31. An apparatus comprising:
means for collecting visitor website presence information based on at least one of object-selectable information selected by a one or more website objects, object-supplied information provided by the one or more website objects, and derived information derived from information known about the one or more website objects;
means for applying a privacy filter to the visitor website presence information to create filtered visitor website presence information;
means for sending the filtered visitor website presence information to one or more website presence servers;
means for receiving aggregated website presence information from the one or more website presence servers; and
means for presenting the aggregated website presence information based at least in part on a website object profile for a visitor to the website.

32. The apparatus of claim 31, further comprising means for repeating the collecting, applying, sending, receiving, and presenting until the visitor leaves the website.

33. The apparatus of claim 31 wherein the website object profile comprises an indication of one or more interests of the object.

34. The apparatus of claim 31 wherein the website object profile comprises an indication of contact information of the object.

35. The apparatus of claim 31 wherein the website object profile comprises an indication of the type of aggregated website presence information to exclude from display to the object.

36. The apparatus of claim 31 wherein the website object profile comprises a privacy filter indicating website presence information not for publication to other objects of the website.

37. The apparatus of claim 31 wherein the visitor website presence information is based at least in part on activity of the one or more objects at the website.

38. The apparatus of claim 31, wherein the visitor website presence information indicates one or more of:

a state of a website object regarding its participation in a communication session;

an ability of the website object to participate in a communication session; and a willingness of the website object to participate in a communication session.

39. The apparatus of claim 31, wherein the website presence information is based at least in part on a website visitor's current activity.

40. The method of claim 39, wherein the website presence information indicates one or more of:

the website visitor is currently in a demo;
the website visitor is currently "just looking";
the website visitor is currently "shopping"; and
the website visitor is currently "checking out".

41. The apparatus of claim 31, wherein the visitor website presence information is derived from information known about a website object by a website presence deriver.

42. The apparatus of claim 41, wherein the visitor website presence information derived from information known about a website object indicates a website visitor is confused.

43. The apparatus of claim 31, wherein the visitor website presence information comprises information regarding a product that a first website visitor visiting the website is considering for purchase.

44. The apparatus of claim 43, wherein the information regarding the product is viewable by a second website visitor visiting the website.

45. The apparatus of claim 31, wherein applying the privacy filter to the visitor website presence information includes the privacy filter specifying how the visitor website presence information is collected, and which of the visitor website presence information is made available for viewing by other website visitors visiting the website.

46. A nontransitory program storage device readable by a machine, embodying a program of instructions executable by the machine to perform a method, the method comprising:

collecting visitor website presence information based on at least one of object-selectable information selected by a one or more website objects, object-supplied information provided by the one or more website objects, and derived information derived from information known about the one or more website objects;

applying a privacy filter to the visitor website presence information to create filtered visitor website presence information;

sending the filtered visitor website presence information to one or more website presence servers;

receiving aggregated website presence information from the one or more website presence servers; and presenting the aggregated website presence information based at least in part on a website object profile for a visitor to the website.

47. The nontransitory program storage device of claim 46, the method further comprising repeating the collecting, applying, sending, receiving, and presenting until the visitor leaves the website.

48. The nontransitory program storage device of claim 46 wherein the website object profile comprises an indication of one or more interests of the object.

49. The nontransitory program storage device of claim 46 wherein the website object profile comprises an indication of contact information of the object.

50. The nontransitory program storage device of claim 46 wherein the website object profile comprises an indication of the type of aggregated website presence information to exclude from display to the object.

51. The nontransitory program storage device of claim 46 wherein the website object profile comprises a privacy filter indicating website presence information not for publication to other objects of the website.

52. The nontransitory program storage device of claim 46 wherein the visitor website presence information is based at least in part on activity of the one or more objects at the website.

* * * * *